United States Patent

Richardson et al.

[11] Patent Number: 5,966,684
[45] Date of Patent: Oct. 12, 1999

[54] METHOD AND APPARATUS FOR CANCELLING PERIODIC ELECTRICAL INTERFERENCE

[76] Inventors: Thomas L. Richardson, 1164 West 21st Street, North Vancouver, Canada, V7P 2C8; Robert F. Richardson, 1304 East 29th Street, North Vancouver, Canada, V7J 2T2

[21] Appl. No.: 08/745,943

[22] Filed: Nov. 8, 1996

Related U.S. Application Data

[60] Provisional application No. 60/006,526, Nov. 9, 1995, abandoned.

[51] Int. Cl.[6] .................................................. H04B 15/00
[52] U.S. Cl. ......................... 702/191; 702/190; 702/195; 364/724.011
[58] Field of Search .................................. 702/191, 190, 702/195; 364/528.15, 704.011, 724.07; 381/71.11

[56] References Cited

U.S. PATENT DOCUMENTS 5,029,118 7/1991 Nakajima et al. .................. 364/724.19
5,537,443 7/1996 Yoshino et al. ...................... 364/724.2

OTHER PUBLICATIONS

Kobtatake, Hidefumi, "Synchronous Adaptive Filter—A Synchronous Adaptive Noise Cancelling System for Periodic Interferences" Jul. 1982.

*Primary Examiner*—Kamini Shah
*Attorney, Agent, or Firm*—Oyen Wiggs Green & Mutala

[57] ABSTRACT

A system involving method and apparatus for cancelling a periodic electrical interference signal from a signal of interest is disclosed. The system of the invention creates an estimate of the periodic noise component in an electrical signal by sampling the electrical signal at intervals locked to the period of the source of the electrical interference signal. The system analyzes the sampled signal to isolate periodically repeating portions of the signal characteristic of noise. The system inverts the estimate of the noise component and constructs a continuous repeating waveform which is added to the electrical signal. The system does not eliminate transient features of the signal of interest, even when those transient features have frequency components which overlap with frequencies present in the electrical interference signal.

20 Claims, 22 Drawing Sheets

GENERAL FORM b(1) ... b(k) ... b(m)

s(1) ... s(k) ... s(m)   SOURCE BUFFER
o(1) ... o(k) ... o(m)   OUTPUT BUFFER

SOURCE BUFFER

OUTPUT BUFFER

METHOD AND APPARATUS FOR CANCELLING PERIODIC ELECTRICAL INTERFERENCE

REFERENCE TO RELATED APPLICATIONS

This application claims priority from, and relates to, the disclosure of our U.S. provisional application No. 60/006,526 filed Nov. 9, 1995, abandoned and entitled Electrical Interference Cancellation Method and Apparatus, which is incorporated herein by reference.

FIELD OF THE INVENTION

This invention relates to a method and apparatus for removing periodic electrical interference, such as interference caused by power line noise, from an electrical signal. The invention has particular application in cancelling electrical interference in audio signals and in bio-electrical signals.

BACKGROUND OF THE INVENTION

Our world is bathed in electrical noise. Electrical noise can make it difficult to properly measure or transmit small electrical signals by causing electrical interference signals to be present along with the electrical signals of interest. Signals detected with high impedance sensors and/or processed by high gain amplifiers are particularly prone to being contaminated by electrical interference. An extremely wide range of devices used in audio, engineering, medicine and research incorporate high impedance electrical sensors. Examples include microphones, guitar pickups, skin sensors (EKG, EMG, EEG) and microelectrodes used in the neurosciences.

Electrical noise or "interference" is typically the result of the electromagnetic fields generated by electrical currents flowing in electrical or electronic circuits and equipment. Electromagnetic fields can cause interference by several mechanisms. High impedance electronic circuits and ground loops may act as antennas and pick up the electromagnetic field. In other cases poor ground lines carrying high currents can cause ground signals to develop a periodic voltage fluctuation.

Many of the most common and troublesome sources of electrical noise are periodic. The most common form of electrical interference is generated by the power mains but there are other sources. For example, the screen refresh on a computer monitor or television can generate periodic electrical interference. Electrical interference may be induced by alternating current in power supplies, lights and/or other electrical equipment. Periodic electrical interference appears as a repeating waveform superimposed on the signal of interest. The period of the interference signal is the same as the period of the source of the interference. The electrical interference signal may have a very complicated waveform. For example, the wave form of an electrical interference signal caused by power mains in North America would usually appear when viewed on an oscilloscope as a complex spike which repeats at a rate of 60 Hz.

Electrical interference is a major concern in scientific research and in the music industry since it can significantly degrade signal quality. Unfortunately, it is notoriously difficult to remove without also altering the original signal of interest imbedded in the noise. What is needed, and what is not provided in the prior art, is a good method for removing periodic electrical interference from an electrical signal without significantly affecting the electrical signal.

The most common method for removing periodic electrical interference from a signal is to pass the signal through a notch filter tuned to the fundamental frequency of the electrical interference. A notch filter is designed to remove all signal components at a specific frequency and to let all other frequencies pass without attenuation. For example, for removing electrical interference induced by the power mains in North America a notch filter tuned to 60 Hz would be used because 60 Hz is the fundamental frequency of the a.c. power supplied in North American power mains (power mains operate at a frequency of 50 Hz in many other regions). This method effectively eliminates the 60 Hz component of the electrical interference. Unfortunately, it also eliminates the 60 Hz components of the primary signal of interest which also pass through the filter. This loss of signal components, and the introduction of phase distortion, makes the use of notch filters unacceptable when precise characteristics of the signal of interest are important.

Another problem with using a simple notch filter to remove electrical interference is that a notch filter often fails to remove all of the electrical interference even if the filter is accurately tuned to the fundamental period of the electrical interference signal. This is because interference usually has significant power at various harmonics of its fundamental frequency. For example, the electrical interference induced by fluorescent lamps often has frequency components at several harmonics of 60 Hz (120 Hz, 180 Hz, 240 Hz ... n*60 Hz). Some of these harmonics have frequencies greater than several kHz and many harmonics may have more power than the fundamental. A simple notch filter tuned to 60 Hz will only eliminate the fundamental while the harmonics continue to contaminate the signal.

Comb filters are filters which remove signal components at a fundamental frequency and also remove signal components at harmonics (i.e. integer multiples) of the fundamental frequency. In some applications comb filters may be used to eliminate electrical interference from a signal. However, comb filters will also eliminate the frequency components from the signal of interest at each of the multiple corner frequencies of the comb filter. As a result, the signal of interest is distorted.

Some have attempted to reduce the effect of notch or comb filters on a signal of interest by using notch or comb filters with very narrow notches. Notch filters produce maximal attenuation of the signal at the notch frequency (e.g. 60 Hz). However, they also attenuate frequency components which are slightly above of below the notch setting. The width of the notch refers to the range of frequencies influenced by the filter. If a very narrow notch is used then fewer frequencies in the signal of interest are affected by the filter. However, the narrower the notch, the greater the need for precise matching of the center frequency of the filter to the periodicity of the noise generator. Furthermore, narrow band filters tend to oscillate in response to transient events such as a pulse or the edge of a square wave signal.

The problem of ensuring that the center frequency of a very narrow notch filter is tuned to the frequency of a noise signal may be addressed by using adaptive filters. Adaptive filters monitor a reference signal from the source of the electrical interference (the "noise generator") and use this information to adjust the frequency of the filter to coincide with the precise frequency of the noise. Although use of a finely tuned notch filter decreases distortion of the signal of interest, distortion remains a problem. Furthermore, the need for comb filters in many applications leads to potential distortion of the signal of interest at frequencies equivalent to the fundamental and each of the harmonics of the noise generator.

Removing an electrical interference signal without affecting a signal of interest is a particular problem where the signal of interest is music or other audio signals. Musical signals normally contain a wide range of frequency components spanning the complete bandwidth of the recording system. For example, audio signals are made up of frequencies ranging roughly from 20 Hz to 20 kHz. These frequencies overlap with the 60 Hz fundamental frequency of power mains generated electrical interference as well as all harmonics of 60 Hz up to the 20 kHz upper limit of the audio signal. There are more than 300 evenly spaced harmonics across this range. A comb filter would need to have notches at each of these harmonics to remove all of an electrical interference signal having a fundamental frequency of 60 Hz. Although such a comb filter would eliminate the electrical interference signal, it would also remove all components of the audio signal with frequencies equal to 60 Hz, 120 Hz, 180 Hz . . . 19,920 Hz, and 19,980 Hz. The distortion caused by filtering these frequencies from the audio signal usually makes this approach unacceptable. Signals recorded in clinical medicine, medical research, biological research and other scientific and engineering activities also have frequency components which span the same range as the fundamental and harmonics of periodic electrical interference. Therefore, notch filters are also unacceptable for noise reduction in most of these applications.

Kobatake, *Synchronous Adaptive Filter*, Papers of Society of Instrument and Control Engineers, v. 19, No. 3, pp. 34–40 discloses an adaptive noise canceller for periodic interference. Kobitake notes that his system acts as a series of notch filters at harmonics of the fundamental frequency and notes that his system could cause distortion of a signal of interest at higher harmonics of the fundamental frequency of the filter.

Nakajima et al. U.S. Pat. No. 5,029,118 describes a system and method for cancelling a periodic noise superimposed on a real signal component of an original signal. The primary problem addressed by Nakajima et al. is to cancel a relatively high frequency periodic noise signal from a signal containing a relatively very slowly varying d.c. signal. Nakajima et al. discuss applications in detecting the torque on the output shaft of a torque converter in an automotive automatic transmission.

SUMMARY OF THE INVENTION

An object of this invention is to provide a noise cancellation device and method for substantially eliminating periodic electrical interference without significantly altering the signal of interest.

An object of a second aspect of the invention is to provide a method for learning the shape of a periodic noise waveform imbedded in a complex signal of interest where the shape of the periodic noise waveform may slowly evolve over time or jump to new levels.

Accordingly, the invention provides a method for cancelling electrical interference from an electrical signal. The method comprises the steps of: a) providing an electrical signal comprising a signal of interest and a periodic interference signal having a period, the interference signal and the signal of interest both having components at one or more common frequencies; b) cancelling the electrical interference signal from the electrical signal, without affecting the signal of interest at the common frequencies, by the steps of: i) providing a timing signal having a period equal to the period of the interference signal; ii) generating a sequence of digitized segments of the electrical signal by sampling and digitizing the electrical signal at times controlled by the timing signal, each digitized segment comprising a sequence of sampled values representing a segment of the electrical signal having a period equal to the period of the interference signal; iii) generating an estimate of the interference signal from the digitized segments by extracting a stationery component from the digitized segments and periodically updating the estimate; iv) generating a continuous, periodic anti-interference signal from the estimate; and, v) adding the anti-interference signal to the electrical signal to substantially cancel the electrical interference signal from the electrical signal.

Another aspect of the invention provides a method for cancelling interference from a signal comprising a signal of interest mixed with a periodic interference signal having a period. The method comprises the step of adding an anti-interference signal to the signal to substantially cancel the periodic interference signal from the signal. The anti-noise signal is derived by the steps of: a) in each of several sequential periods of said periodic interference signal, taking a plurality of m samples v(k), of said signal after said addition of said anti-noise signal, said samples taken at spaced apart phases of said interference signal, where k is an index representing said spaced apart phases with $1 \leq k \leq m$; b) for each value of k, digitally integrating said sampled values v(k) and storing results of said integration in an integrator buffer; c) performing a modified lateral filtering operation on said results in said integrator buffer and storing results of said modified lateral filtering operation as values in a replica buffer; and, d) creating a continuous anti-interference signal having a waveform defined by said values in said replica buffer.

BRIEF DESCRIPTION OF THE DRAWINGS

In the enclosed drawings, which illustrate non-limiting preferred embodiments of the invention.

DETAILED DESCRIPTION OF PREFERRED EMBODIMENTS OF THE INVENTION

This invention takes advantage of several distinct differences between a periodic electrical noise signal and most real world signals to remove periodic noise from signals of interest. These differences become apparent when the noise and signal of interest are considered as waveform segments, as if viewed as traces displayed on an oscilloscope. In this view, the waveform segments can be described in terms of their shape.

Figure 1:
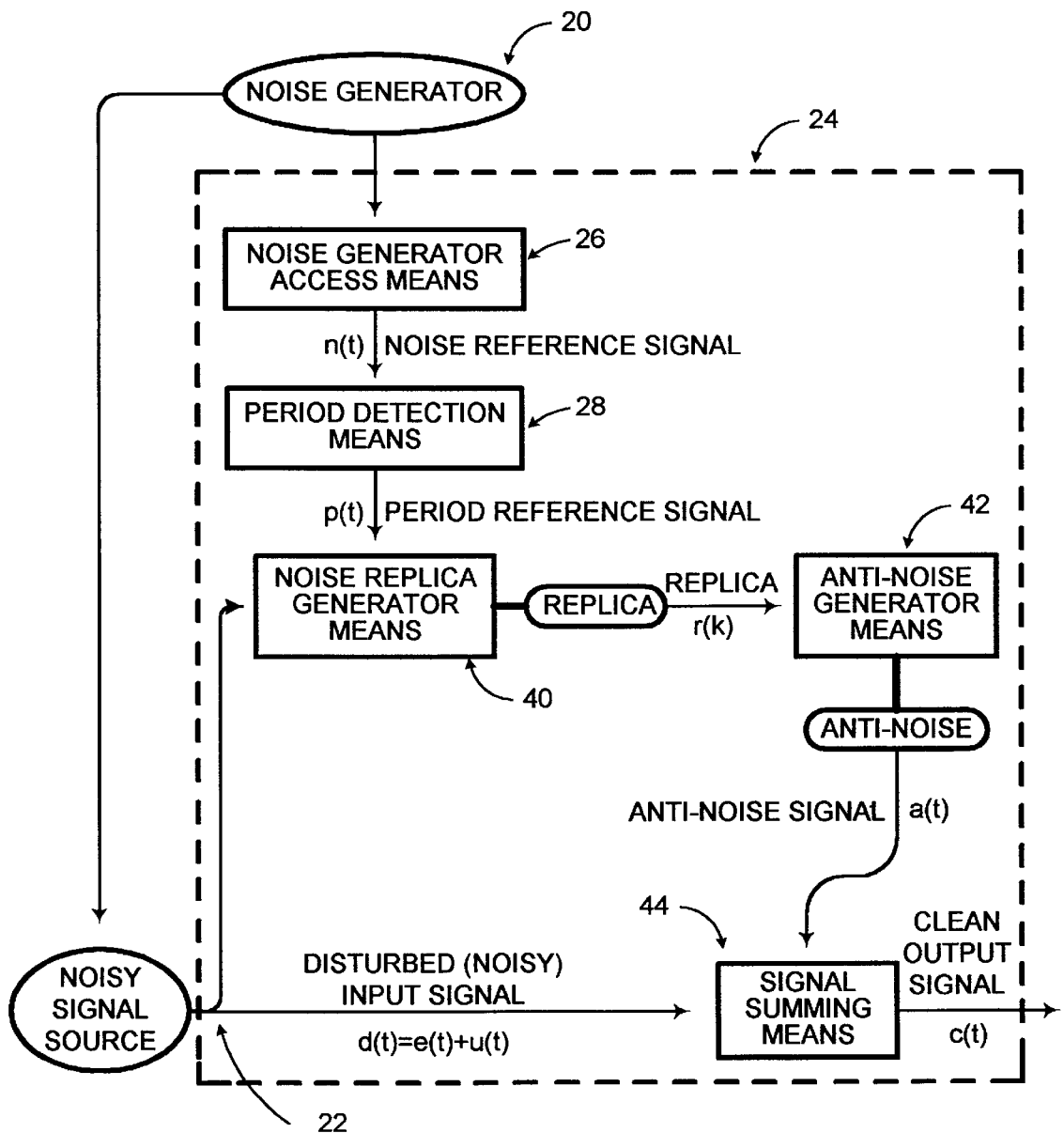
FIG. 1 is a block diagram which schematically illustrates the operation of the method and apparatus of the invention.

FIG. 1 illustrates a typical situation in which a noise generator 20, which may be any source of a periodic electrical interference signal and is often the power mains, causes a periodic electrical noise signal e(t) to exist in a signal line 22 which also carries a signal of interest u(t). The result is that signal line 22 carries a noisy signal d(t) where d(t)=e(t)+u(t). This invention provides a method for cancelling e(t) from the signal in line 22 to yield a clean output signal c(t) which is substantially equal to e(t).

The inventors have determined that the shape of the waveform e(t) associated with a periodic noise source has several key features as follows:

1) e(t) appears as if it were constructed from a sequence of substantially identical waveform segments, each segment having a length equal to the period of the noise generator;
2) These waveform segments are precisely synchronized to the period of the noise generator;
3) The shape of each segment may be simple or very complex depending on the specific characteristics of the noise generator and its relationship to the perturbed system;
4) The shape of each segment is identical when the noise is stable;
5) Even if the noise is changing over time the change in shape between sequential segments is usually very small. The result is that the shape slowly evolves across a series of many segments. For example, the noise component on an electromyographic ("EMG") recording of electrical activity in muscle tissue may slowly evolve as contact between the electrode and skin slowly deteriorates;
6) Occasionally, the shape of the noise waveform may suddenly change if there is an equally sudden change in the characteristics of the noise generator. For example, the noise induced by the power mains may change if an electric instrument is turned on or off. However, these sudden changes do not occur as random fluctuations between a series of sequential segments. Instead, the noise waveform will rapidly develop a new shape and all subsequent waveform segments will have this new shape until some new change in the noise source occurs.

A real world signal of interest can also be considered to be made up of a series of segments, each segment having a length equal to the period of a noise generator. The shapes of such segments from many real world signals of interest u(t) (which may typically be signals such as a biological signals recorded from living tissue, audio signals, signals generated by some form of scientific or engineering equipment or any other signals of interest to the observer) have the following key features:

1) Often the waveform of a real world signal will vary continuously with no apparent repeating pattern. That is, the segments will generally have very different shapes;
2) If a real world signal is divided into a sequence of waveform segments which have a length equal to one period of the noise generator, then each segment will have a unique shape and the shape will appear to vary randomly between sequential segments. This occurs since most signals continuously vary in a complex fashion and are seldom directly associated with the noise generator in a time locked fashion. For example, an EMG waveform, recorded from muscle, will continuously vary in a random fashion;
3). Some real world signals do have repeating waveforms. However, the period of such signals is seldom identical to the period of the noise generator. For example, an electrocardiogram (EKG) recorded from the heart has a regularly recurring waveform associated with each heart beat. However, the interval between heart beats varies significantly from beat to beat and the rate is always substantially less than the 60 Hz noise which often contaminates these recordings. Even if the period of the signal of interest is relatively close to the noise period, the shape of noise locked waveform segments will vary widely between sequential segments. This will occur because the repeating event will appear in a slightly different location in each segment. Although the human eye may notice that two segments are similar except for a shift along the time axis, the shape of the two segments will not overlap if they are superimposed.

This invention exploits the above-noted differences between e(t) and u(t) to separate noise from the signal of interest. Broadly stated, the method of the invention involves determining the shape of the electrical interference signal e(t), generating a waveform r(k) which has this shape, using the generated waveform r(k) to generate an anti-noise signal a(t) and adding the anti-noise signal a(t) to the noisy signal d(t) to yield a cleaned signal c(t).

An electrical interference cancellation apparatus according to one aspect of the invention includes a feed forward loop. In a preferred embodiment, described below, the apparatus includes a feedback loop. The feed forward embodiment will be described first because it is simpler.

As shown in FIG. 1, feed forward electrical interference cancellation apparatus 24 comprises a reference signal generator 26. Reference signal generator 26 provides a periodic noise reference signal n(t) which has the same period as signals generated by noise generator 20. Noise reference signal n(t) is then conditioned in period reference signal generator 28 which produces a period reference signal p(t) suitable for use as a timing signal in apparatus 24, as described below. Apparatus 24 has a noise replica generator 40 which generates a replica of the noise component e(t) of noisy signal d(t) by using period reference signal p(t) and signal d(t). The replica is inverted by an anti-noise generator 42. Anti-noise generator 42 uses the inverted noise replica as a template to generate a continuous waveform a(t) with a shape which is equivalent to an inverted copy of the noise component in the original noisy signal. The periods of anti-noise signal a(t) and noise generator 20 are precisely synchronized. Anti-noise signal a(t) is then added to signal d(t) by a summing means 44 to produce a cleaned output signal c(t).

Timing Signal Generation

There are many ways to provide a noise reference signal generator 26 for generating n(t) for a particular noise generator 20. In general, as shown in FIG. 4A, noise reference signal generator 26 comprises a detection means 30 for detecting a signal generated by noise generator 20 and, where necessary, some signal conditioning means 32 for filtering and/or adjusting the amplitude and/or waveform of the raw noise signals rn(t) detected by detection means 30.

The purpose of signal conditioning means 32 is to enhance the fundamental of the periodic signal rn(t). In some cases this is not necessary since rn(t) is already dominated by the fundamental. For example, the output of a transformer connected to the power mains will have a single frequency component identical to the fundamental frequency of the power mains (60 Hz in North America). In other cases, harmonic content may mask the fundamental and make it more difficult for the period detector means to carry out its function. In these cases a conditioning means 32 desirable. Conditioning means 32 may, for example, include a bandpass filter to allow the fundamental to pass while reducing the amplitude of any harmonics present in the raw noise rn(t).

Figure 4B:
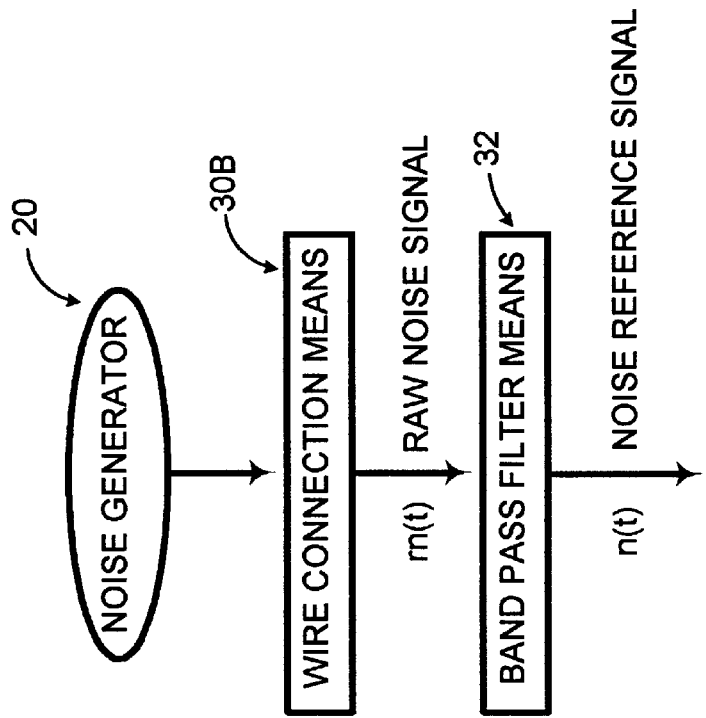
FIGS. 4A, 4B, 4C and 4D illustrate several alternative means for deriving a noise reference signal from a noise source.
Figure 4A:
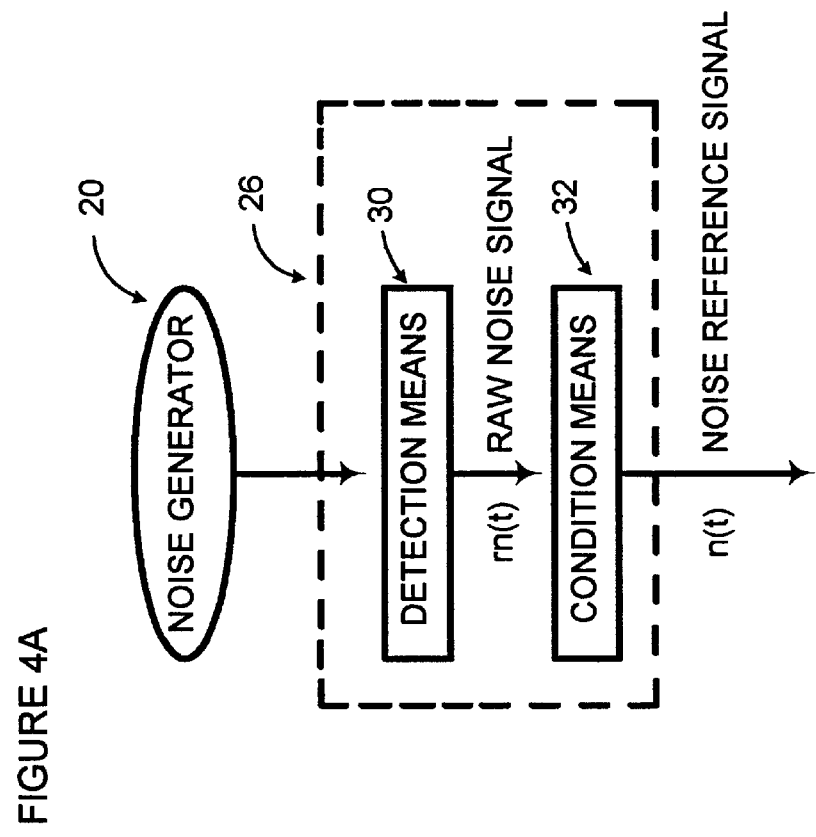
Figure 4D:
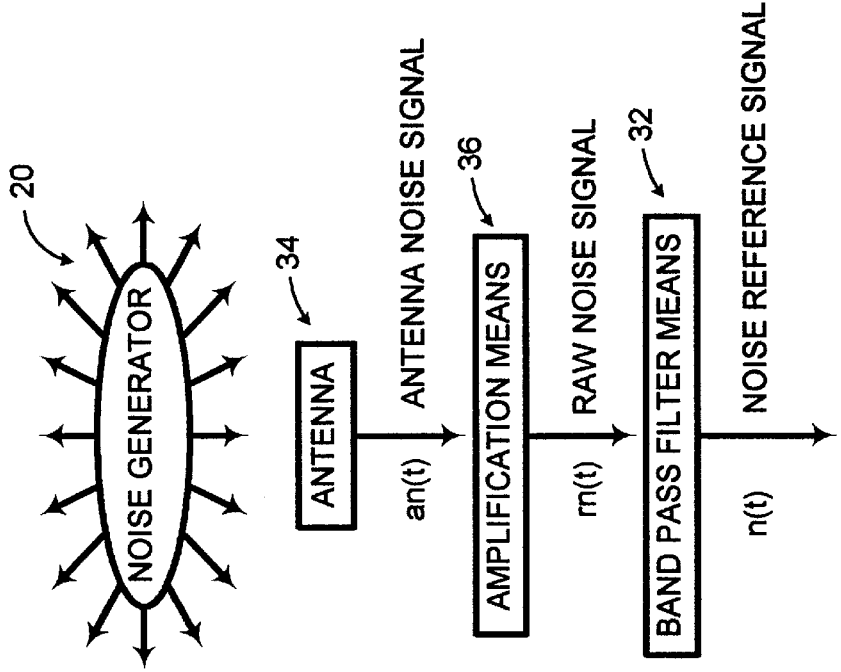
Figure 4C:
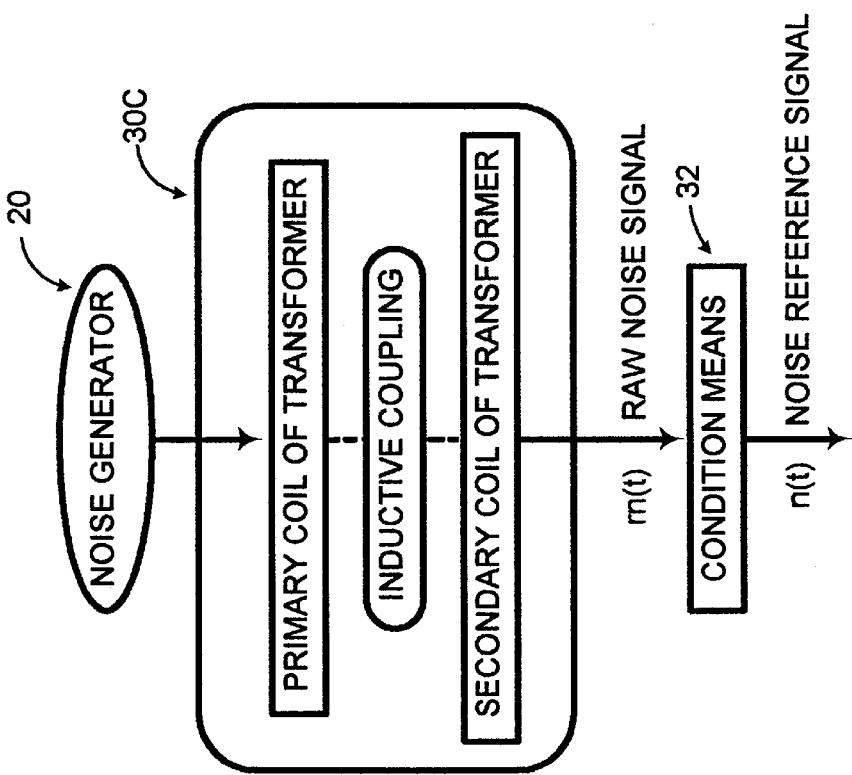

Some alternative embodiments for a noise reference signal generator 26 are shown in FIGS. 4B, 4C, and 4D. In the embodiment of FIG. 4B, a direct electrical connection is used to gain access to noise generator 20. This provides an exact copy of signals present in noise generator 20 and is the simplest way to obtain a signal from noise generator 20 where a direct connection is practical.

In the embodiment of FIG. 4C, a transformer 30C is used to inductively couple to a signal from noise generator 20. Noise generator 20 drives the primary coil of transformer 30C. The secondary coil of transformer 30C generates raw noise signal, rn(t). This embodiment electrically isolates raw noise signal rn(t) and can simultaneously reduce (or increase) the voltage of rn(t) to a level which is appropriate for further processing in a low voltage environment. The embodiment of FIG. 4C is generally preferred when noise generator 20 is the power mains.

In the embodiment of FIG. 4D, an antenna 34 connected to the high impedance input of an amplifier 36 is used to pick up electromagnetic radiation from a noise source 20. This embodiment may be used in cases where it is impractical to make a direct connection to noise generator 20. For example, this embodiment could be used to pick up electromagnetic radiation where noise generator 20 is the screen refresh circuitry of a computer monitor without actually connecting any wires to the computer monitor.

In cases where the frequency of noise generator 20 is known and is stable noise reference signal generator 26 may comprise a clock which produces signals having the same period as noise generator 20. For example, noise reference signal generator 26 may comprise a stable oscillator combined with a frequency divider to generate a precise and stable frequency.

Period reference signal generator 28 monitors n(t) and produces a timing signal p(t) (pulse or edge) synchronized to the period of noise generator 20. p(t) is preferably in the form of a pulse train for most applications. In rare cases n(t) will already be suitable for use as a timing signal and a period reference signal generator will not be necessary. There are many possible ways to derive p(t) from n(t). For example, a comparator may be used to detect when noise reference signal, n(t), crosses a specified voltage in a specified direction. If the level is set to zero and the direction is set to positive, then a pulse (or edge) will be generated each time the noise waveform crosses zero in the positive direction (FIG. 2, p(t)). This arrangement would be appropriate to detect the period of an AC coupled raw noise signal with no harmonic content (e.g. pure power mains voltage).

n(t) may contain harmonics. For example, the raw noise picked up by an antenna placed near a video monitor may have a periodic waveform consisting of a sharp spike mixed with lower amplitude components which occurs each time the screen is refreshed. In this example the threshold voltage and direction would be selected to detect the sharp spike.

In some applications n(t) may be too complex to use a simple threshold level to detect the fundamental period. In these cases a shape detection means for generating p(t) may be suitable. A shape detection means produces a pulse each time the shape of the raw noise waveform falls within certain limits. For example, a characteristic waveform component, such as a small spike, could be detected even if other components of the waveform have a greater amplitude. Those skilled in the art will realize that, given a noise generator 20 which causes periodic electrical interference signal, there are a great many equivalent ways to generate a timing signal that has the same period as noise generator 20 and maintains a known phase relationship to noise generator 20.

Generating A Noise Replica

Noise replica generator 40 generates a noise replica. Conceptually, period reference signal, p(t), is used to divide the noisy signal, d(t), into waveform segments equal to a single period of noise generator 20. These segments are precisely synchronized to the periodicity of noise generator 20. Then noise replica generator 40 determines the shape of noise signal e(t) which is imbedded within these segments. The procedure for learning the shape of the noise signal is described below and is based on the assumption that sequential segments of the noise waveform have similar shapes whereas the shape of sequential segments of real world waveforms u(t) vary widely. In effect, noise replica generator 40 extracts the stationary component from the sequence of waveform segments. It does this by monitoring sequential segments of noisy signal d(t) and regularly updating an internal estimate of the noise component imbedded in those segments.

EXAMPLE—A SIGNAL AVERAGING FEED FORWARD NOISE CANCELLATION APPARATUS

Figure 2:
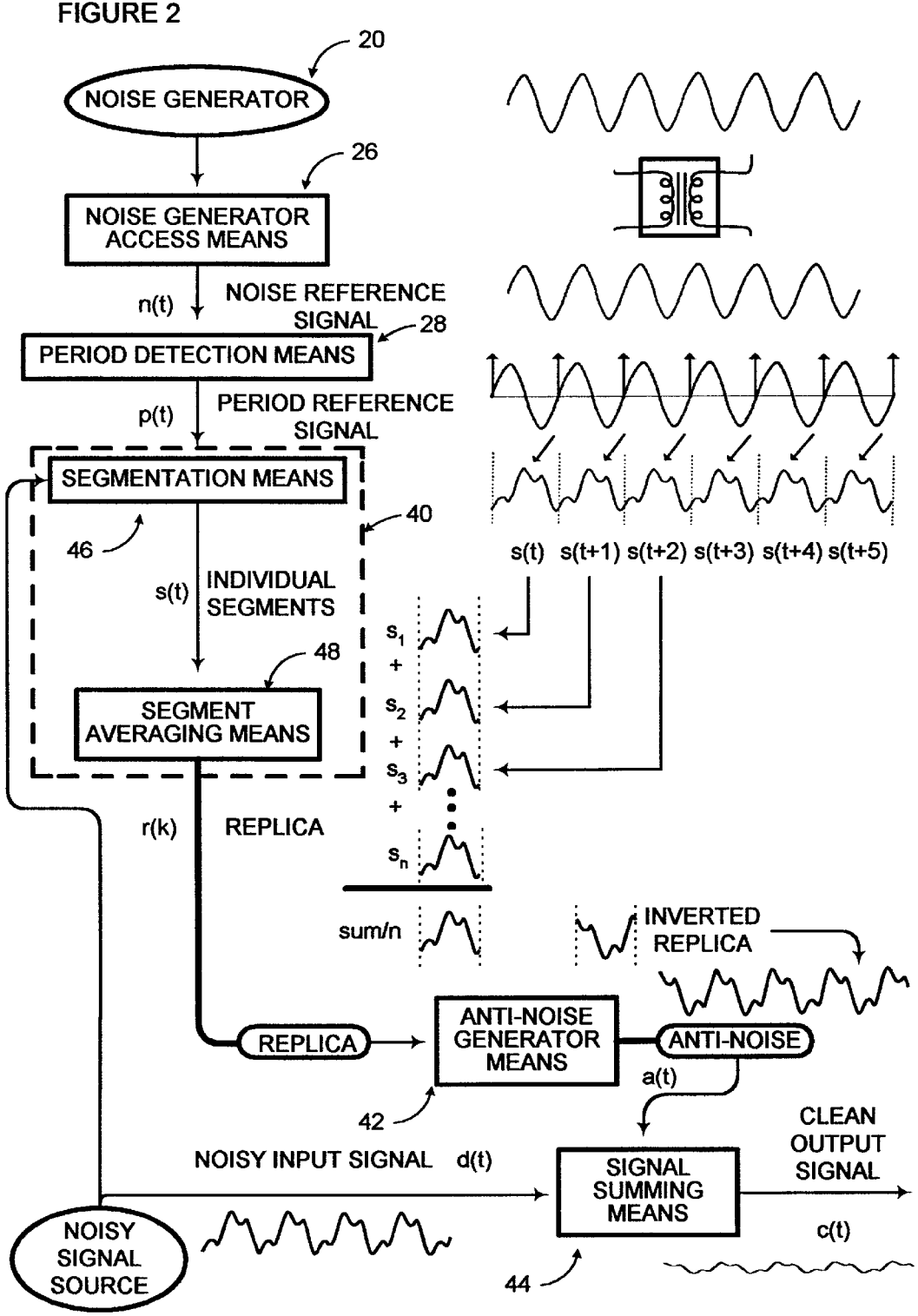
FIG. 2 is a diagram showing example waveforms at various points in the method and apparatus of the invention.

One embodiment of the invention, which is illustrated in FIG. 2, uses signal averaging to generate a noise replica.

This is the easiest embodiment to describe although other embodiments described below are preferred because they are simpler to implement. In the example shown in FIG. 2, the signal of interest u(t) is a simple flat line (i.e. has a constant value of zero). Therefor, the noisy input signal d(t) is dominated by noise e(t) and the cleaned output signal c(t) is nearly flat. The slight remaining noise illustrates the effect of a good, but not perfect, replica of the periodic noise.

In this example the noise generator is a 60 Hz. a.c. power main. The electrical interference signal component of the noisy signal is synchronized to the 60 Hz frequency of the alternating current in the power lines and has a period of ⅟₆₀ second. Noise reference signal, n(t), can be conveniently obtained by a transformer (noise generator access means 26) connected to the power mains. A timing signal p(t) is then generated by a circuit which generates a pulse when n(t) crosses zero (or some other threshold) in a positive (or negative) direction (indicated by vertical arrows on the waveform). As a result, p(t) has one pulse per cycle of the noise generator.

As indicated conceptually in FIG. 2, the timing signal p(t) controls a "segmentation means" 46 which samples the noisy input signal d(t) and extracts adjacent segments of the noisy signal. Each segment, s(t), has a length equal to the time between pulses of p(t). As a result, each segment is synchronized to a single cycle of noise generator 20. The segments are processed to generate an estimate or "replica" of the shape of the electrical interference signal e(t).

In a feed-forward embodiment of the invention, groups of individual segments are averaged to produce the noise replica by an averaging means 48. In this context, the meaning of "average" is not limited to the arithmetical average but includes weighted averages as well. There are two general approaches to averaging. FIG. 2 illustrates a "block average" approach. First, a sequence of n segments (where "n" is an integer) are collected. The value of n is usually in the order of 100 or more. These n segments are then averaged and the resulting waveform is used as the noise replica. The noise replica, is maintained as a series of amplitude values which correspond to a single period of noise. This procedure is repeated for the next n segments. In this way the replica is regularly updated once every n cycles of the noise generator.

A preferred alternative averaging method calculates a new replica for every period of the noise generator. This method uses a "sliding window" to calculate a new replica based on the most recent n segments. In this method, segment averaging means 48 has access to storage for storing waveforms of the most recent n segments. In each period of the noise generator the oldest segment is rejected and the most recent segment is added to the group of stored waveforms. A new replica is then calculated using these segments.

The replica is used by an anti-noise (or "anti-interference") generator to generate a periodic signal a(t). The anti-noise period is precisely locked to the period of the reference signal. The periodic waveforms of a(t) and e(t) are precisely aligned and the shape of a(t) is an inverted approximation to the shape of e(t).

a(t) is added to the noisy input signal d(t) by a signal summing means. a(t) cancels most or all of the periodic noise e(t) in the input signal d(t). If the replica is a good estimate of the periodic noise on the input signal, then the cleaned output signal, c(t), will be virtually noise free. In the example of FIG. 2, c(t) has a little remaining noise, suggesting that the noise replica is not quite perfect.

A trivial signal of interest is used in FIG. 2 to illustrate the method of the invention. In most real world applications the signal of interest consists of complex waveform components which are uncorrelated with the period of the noise source. As a result, variations will occur in the shape of individual waveform segments (s1, s2, s3 . . . , sn) used to calculate the replica. However, the waveform of any periodic noise will still be imbedded in a correlated fashion within each segment. When the waveforms are averaged, variations in the segments shapes due to the signal of interest will tend towards an average of zero, whereas the consistent waveform of the noise component within each segment will tend towards an average equivalent to the shape of the periodic noise imbedded in the signal. Therefor, the replica will still approximate the shape of the periodic noise on the input and this noise will be effectively cancelled by the anti-noise. Note that an imperfect noise replica will not distort the signal of interest. Instead, an imperfect replica will cause periodic noise to appear on the output signal as illustrated in FIG. 2.

Preferred Feed Forward Method and Apparatus

Figure 3:
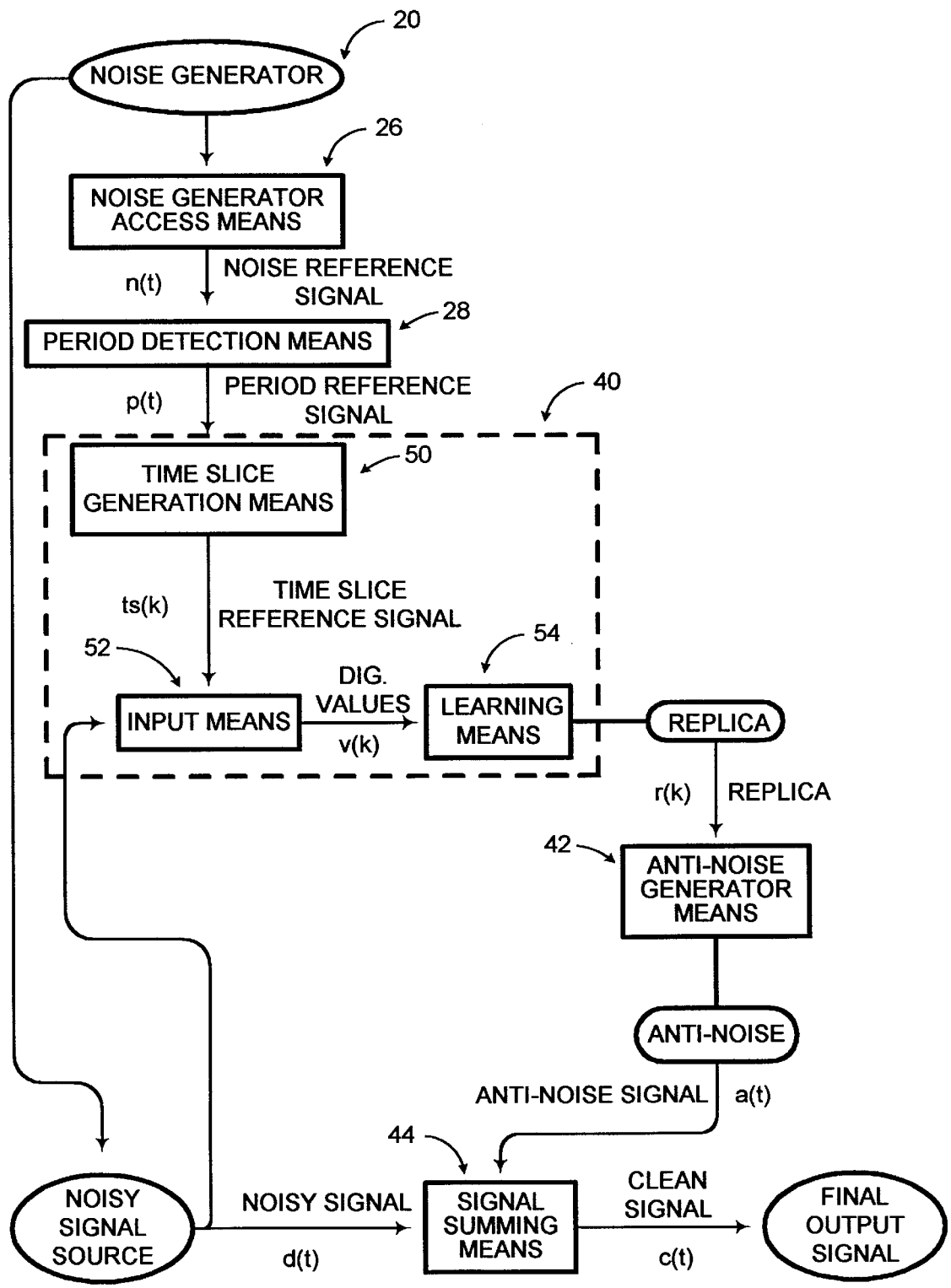
FIG. 3 is a block diagram which schematically illustrates the operation of the method and apparatus of an embodiment of the invention using a time slice generator.

A preferred embodiment of the apparatus and method for providing feed forward noise cancellation, which is described conceptually above, will now be described with reference to FIG. 3. In FIG. 3, noise replica generator 40 includes a time slice generator 50, a signal input 52 and a digital processing or "learning" means 54.

Figure 5:
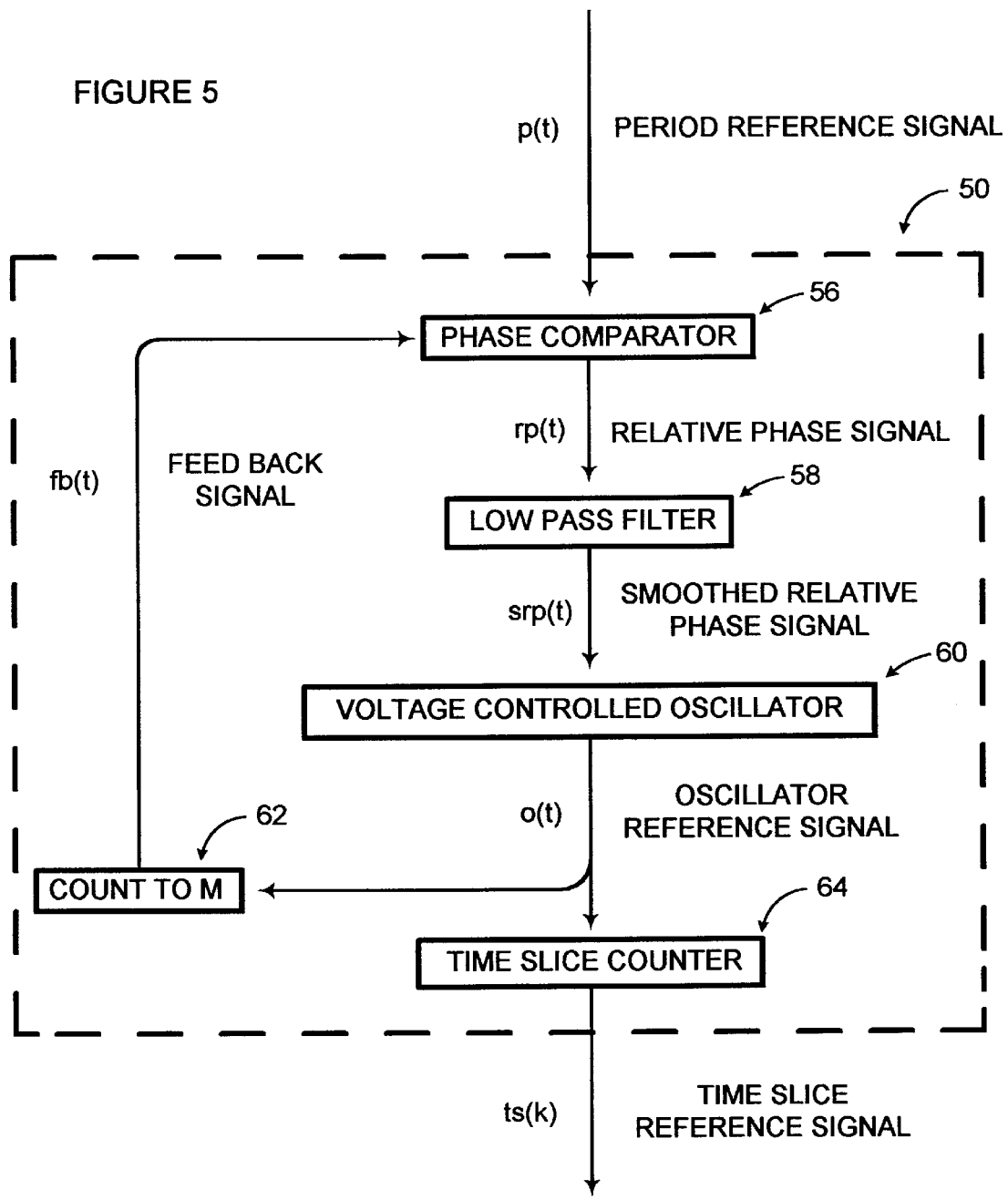
FIG. 5 illustrates a preferred method for generating a time slice reference signal.

Time slice generator 50 divides the period of the noise generator p(t) into m slices. This is done by multiplying the pulse rate of the period reference signal to generate a new timing signal ts(t) with a frequency m times higher than p(t) (as shown in FIG. 5). ts(t) is preferably in the form of a pulse train or square wave for most applications. The multiplication factor is an integer representing the desired number of time slices per period. Several hundred points are required to produce a noise replica with adequate time resolution to effectively cancel complex noise shapes. Therefore, the pulse rate of the time slice reference signal will usually be several hundred times greater than that of the period reference signal.

The frequency multiplication may be carried out, for example, by a phase locked loop as shown in FIG. 5. The loop is tuned to generate a signal having a frequency which is an integer multiple of its input signal p(t). The phase locked loop can be either a commonly available electronic chip, an assembly of discrete components used to implement a phase locked loop, or a program used to simulate a phase locked loop in software. As an alternative to a phase locked loop, an analog frequency multiplication circuit may be used to multiple the frequency of p(t) by m.

Figure 6:
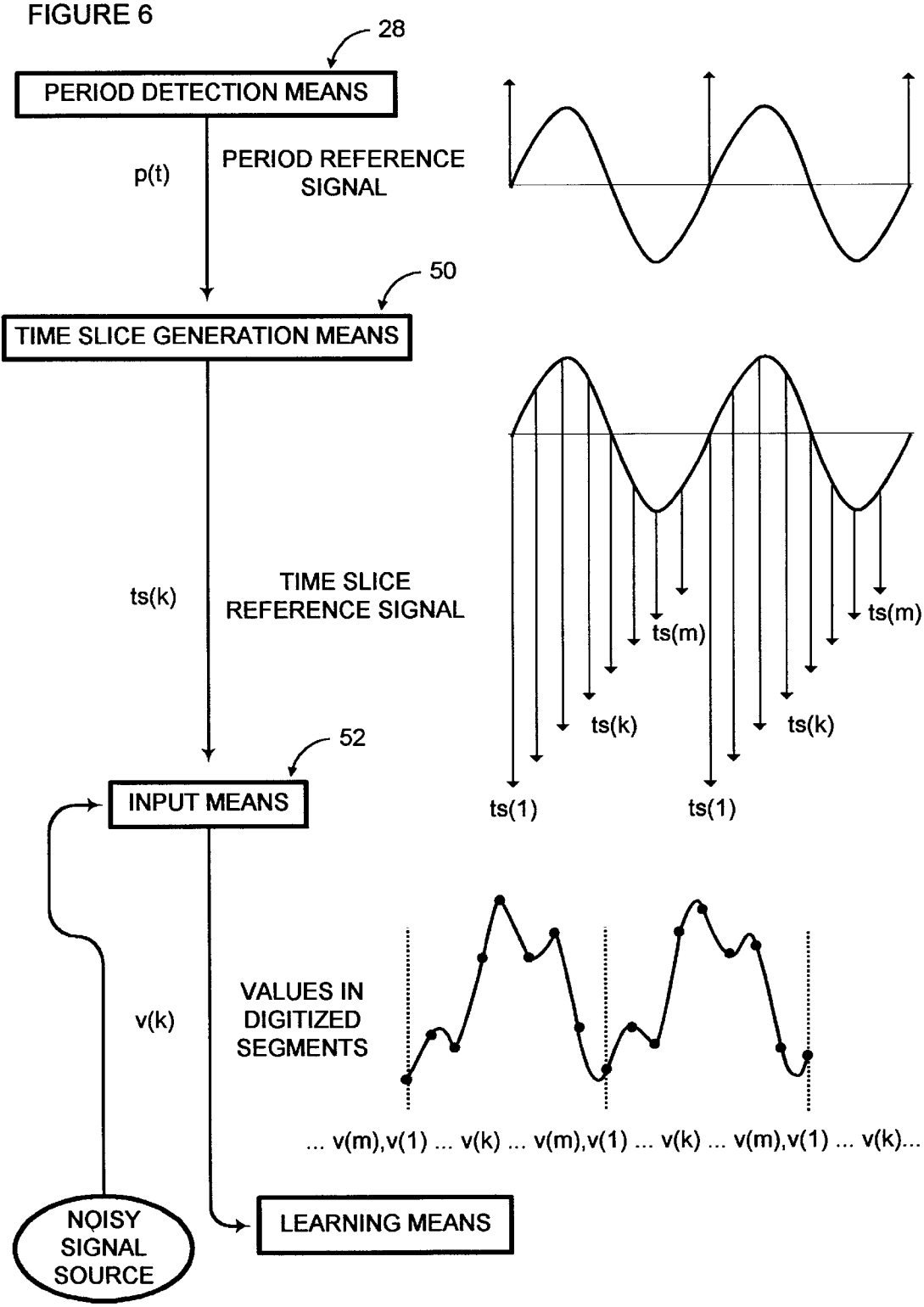
FIG. 6 is a schematic flow chart illustrating the relationship between a period detector, time slice generator, and signal input in a preferred embodiment of the invention.

A time slice counter 64 is incremented from 1 to m during the sequence of time slices between adjacent period pulses, the instantaneous value "k" in time slice counter 64, where k is an integer and $1 \leq k \leq m$, represents the number of the current time slice. For example, a value of 1 in counter 64 refers to the first time slice in a segment. Subsequent values refer to subsequent time slices. The highest value of counter 64, m, refers to the last time slice in a segment. After counter 64 counts to m the counter is reset to 1. The value k can be considered to represent a phase relative to the electrical interference signal e(t). The time slices remain precisely synchronized to the period reference signal such that a period pulse (or edge) occurs every m time slices. The relationship between the period detector, time slice generator, and the input means is shown diagrammatically in FIG. 6.

Figure 7A:
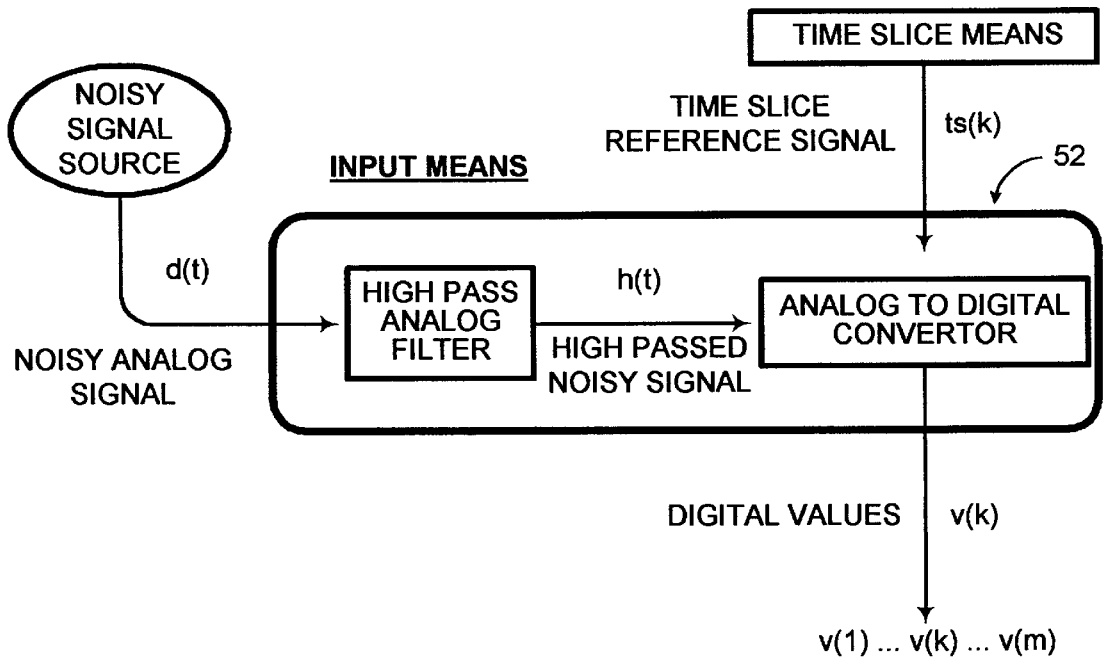
FIG. 7A is a block diagram illustrating an signal input for an analog signal and FIG. 7B is a block diagram illustrating an signal input for a digitized signal.
Figure 7B:
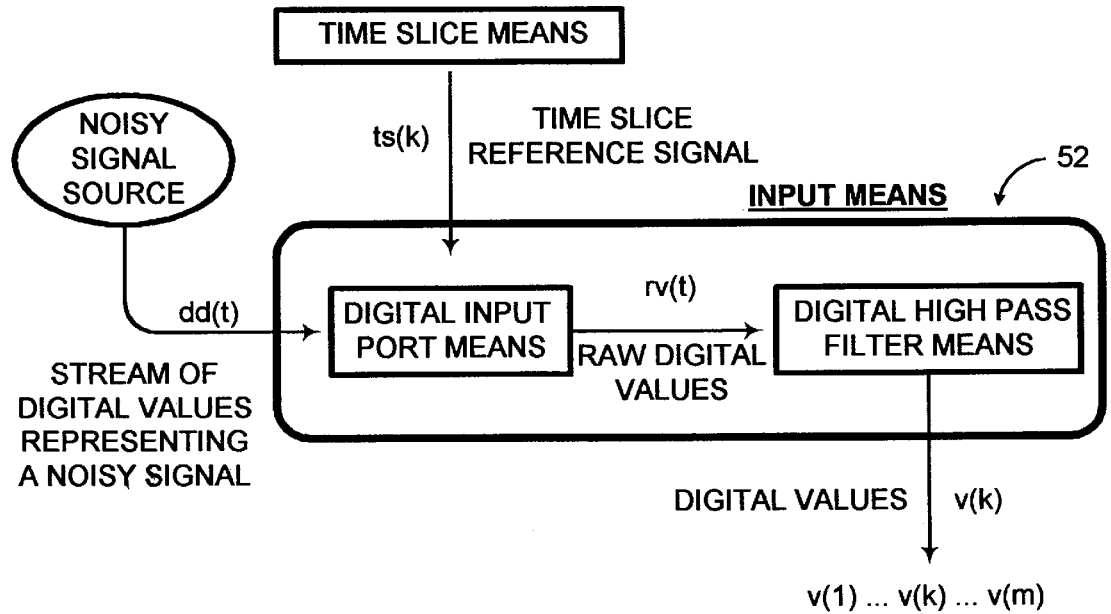

Noise replica generator 40 has an input means 52 which samples the noisy input signal d(t) once for every pulse (or edge) of time slice reference signal ts(t). If d(t) is in analog form, then an analog to digital converter ("A/D" or "ADC") is used to convert d(t) into a digital form (FIG. 7a). If d(t) is already in a digital form (for example, the output from a digital device), then an appropriate data port is used to acquire the signal (FIG. 7b). Input means 52 acquires a value of d(t) on each pulse of the time slice reference signal ts(t). In one period of noise generator 20 input means 52 acquires m values for d(t).

The values v(k) sampled from signal d(t) in each segment (i.e. between subsequent pulses of p(t)) by input means 52 are passed to learning means 54. Learning means 54 essentially extracts the stationary component from the input values. As noted above, a simple way of achieving this goal is to average the values associated with a given value of k over a series of n segments. In each segment, for each value of k, v(k) will have a variable component associated with the signal of interest and an essentially constant value associated with the periodic noise. Therefore, the average of these values will tend towards the constant value associated with the noise component.

One way to average v(k) over a series of segments is fixed frame averaging. Fixed frame averaging (as used in FIG. 2) calculates an average after a fixed number of periods (a "frame") of noise generator 20. A calculation buffer having m spaces is used to implement fixed frame averaging. At the beginning of each frame, the calculation buffer is cleared to zeros. On each subsequent period of noise generator 20 each of the values v(k) sampled from d(t) are added to the corresponding (kth) location in the calculation buffer. After a fixed number of periods of noise generator 20 (the frame size) the values in the calculation buffer are divided by the frame size and the averages are used to update the noise replica which stored in the noise replica buffer. The cycle then repeats itself.

It is important to note that fixed frame averaging will capture any DC offset of the signal of interest u(t) (the periodic noise e(t) has a DC offset of zero by definition). It is desirable to force the DC bias of the noise replica to zero. This may be done by averaging all of the points in the calculation buffer and subtracting this average from each of the points before copying the result to the noise replica buffer. An alternative method for eliminating DC bias from the anti-noise signal a(t) involves maintaining a running average of the DC bias and making the correction as each time slice of the noise replica is updated.

Sliding frame averaging may be used as a preferred alternative to fixed frame averaging. Sliding frame averaging updates the replica in such a way that the values of points in the replica always represent the average of the values obtained during the immediately preceding periods of noise generator 20. Sliding frame averaging averages over a number of periods (the "frame size"). Apparatus for implementing sliding frame averaging requires an array of memory locations (a "frame buffer"), in addition to a calculation buffer as described above. The m rows in the frame buffer each correspond to one of the points in the noise replica. The frame buffer has one "column" for each period in a frame.

In each period of noise generator 20 a new sequence of samples v(k) is received and stored in the frame buffer and the oldest sampled values in frame buffer 20 are discarded. In each period a new average of the samples v(k) in the frame buffer is calculated for each value of k. These average values are saved in the noise replica buffer as the noise replica. When a given time slice is processed the corresponding value in the oldest row of the frame array is subtracted from the noise replica and the value from the new time slice is added. The new time slice also replaces the oldest slice in the frame buffer. The result is a running average based on a sliding (moving) frame.

Using a sliding frame averaging method has the advantage that the replica is updated on each cycle. This makes the learning process smoother than if the updates occurred only after a large number of periods. However, it requires additional memory and processing as compared to using a fixed frame averaging method.

Figure 8:
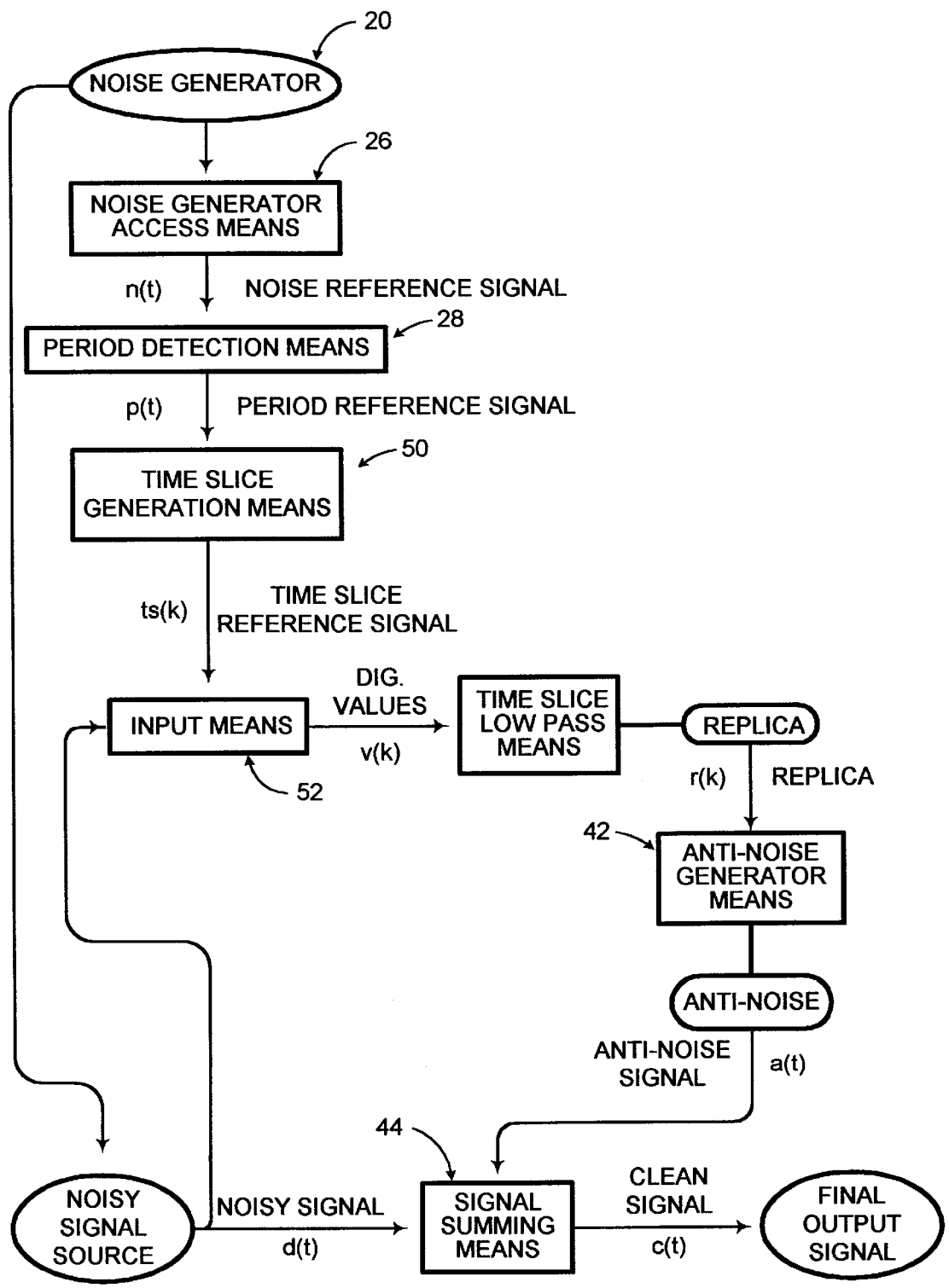
FIG. 8 is a block diagram illustrating noise cancellation apparatus incorporating a time slice low pass means.
Figure 9:
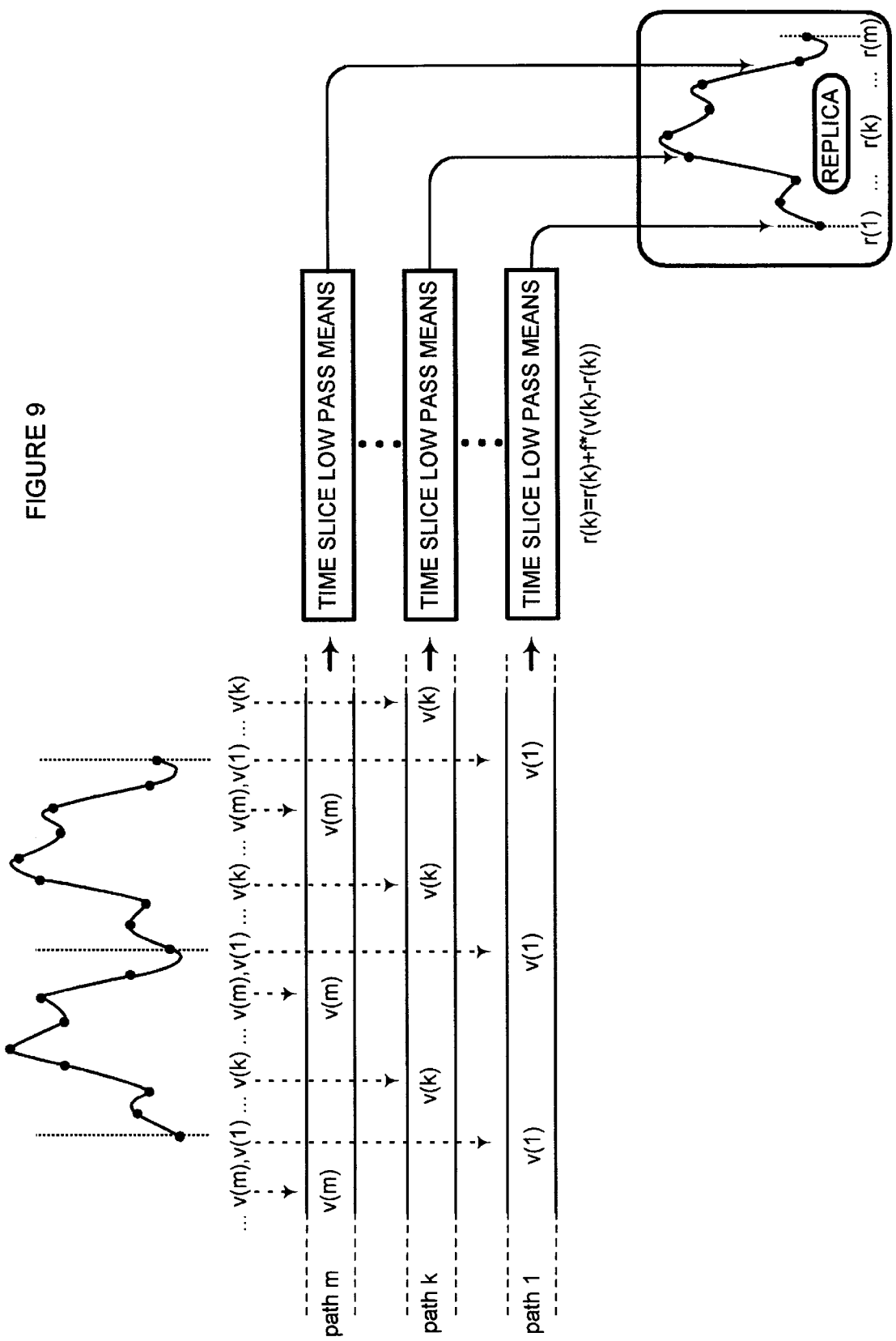
FIG. 9 illustrates the operation of a time slice low pass means.

A preferred implementation of the sliding frame averaging method applies a digital low pass filter to the stream of values v(k) corresponding to each value of k as shown in FIGS. 8 and 9. The digital filtering is done separately for each value of k. In this method, new values corresponding to a given time slice (i.e. a given value of k) are treated as a digitized signal. A low pass filtering procedure is applied to this stream of values to remove the high frequency components associated with the signal of interest. Those skilled in the art will understand that virtually any low pass digital filter function will work. A simple single stage RC equivalent has been found to work well. First, the difference between the present value of the replica for the time slice r(k) and the new value v(k) is calculated. A fraction of this difference is then added to the value of the replica for that time slice. This procedure is carried out for each value of k, as shown in the following equation:

$$r_{new}(k) = r_{current}(k) + f \times (v(k) - r_{current}(k)) \tag{1}$$

where $r_{new}(k)$ is the new value for the kth point in the replica, $r_{current}(k)$ is the current value for the kth point in the replica, f is a fraction, and v(k) is the kth sampled value of d(t) from the latest period of noise generator 20. The corner of the filter is controlled by the size of f. Smaller fractions are associated with a more accurate estimate of the noise waveform but yield a slower learning rate. The DC bias of the replica is removed as described above.

Figure 10:
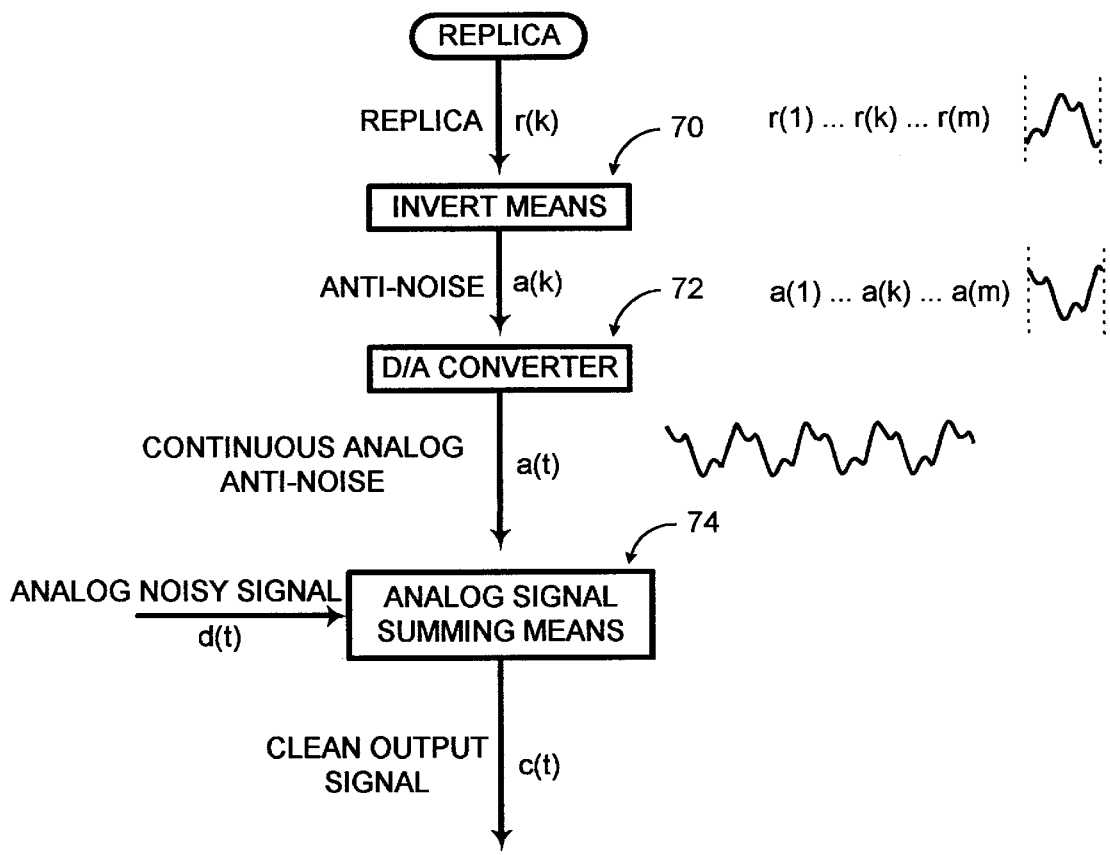
FIG. 10 is a block diagram illustrating the generation of an anti-noise signal in the analog domain.

As illustrated in FIG. 2, the replica is used to generate an anti-noise signal. When d(t) is an analog signal, the following two operations occur on each time slice (as shown in FIG. 10). First, the noise replica is inverted to produce an anti-noise replica, a(k). The anti-noise replica is then passed to a digital to analog ("D/A") converter ("DAC"). The output of the DAC, is a continuous analog signal, a(t). Each period of the signal has a shape equivalent to an inverted version of the replica and the periodicity of a(t) is locked to the period of p(t). The signal a(t) is added to d(t) by an analog summing means indicated generally by 74 to cancel electrical interference signal e(t) from the disturbed signal, d(t).

Figure 12:
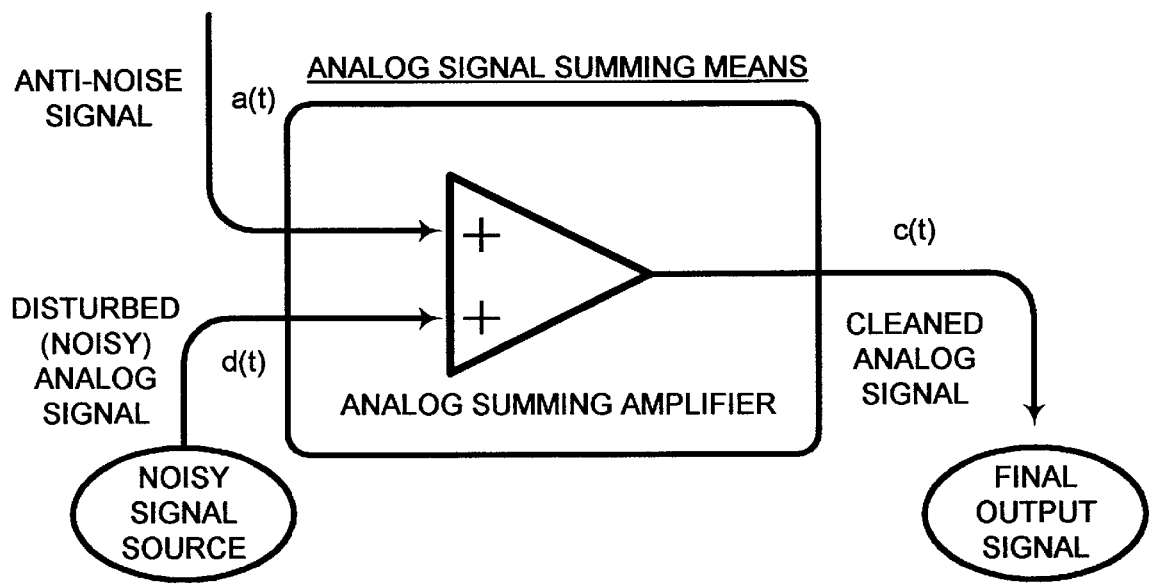
FIG. 12 is a schematic illustration of an analog signal summing device incorporating a differential amplifier for use in practising the invention.

Analog summing means 74 may comprise any of a wide variety of analog voltage summing circuits (FIG. 12). For example, operational amplifiers are routinely used to achieve analog addition. It is also possible to carry out addition by using a simple resistor network.

Figure 13:
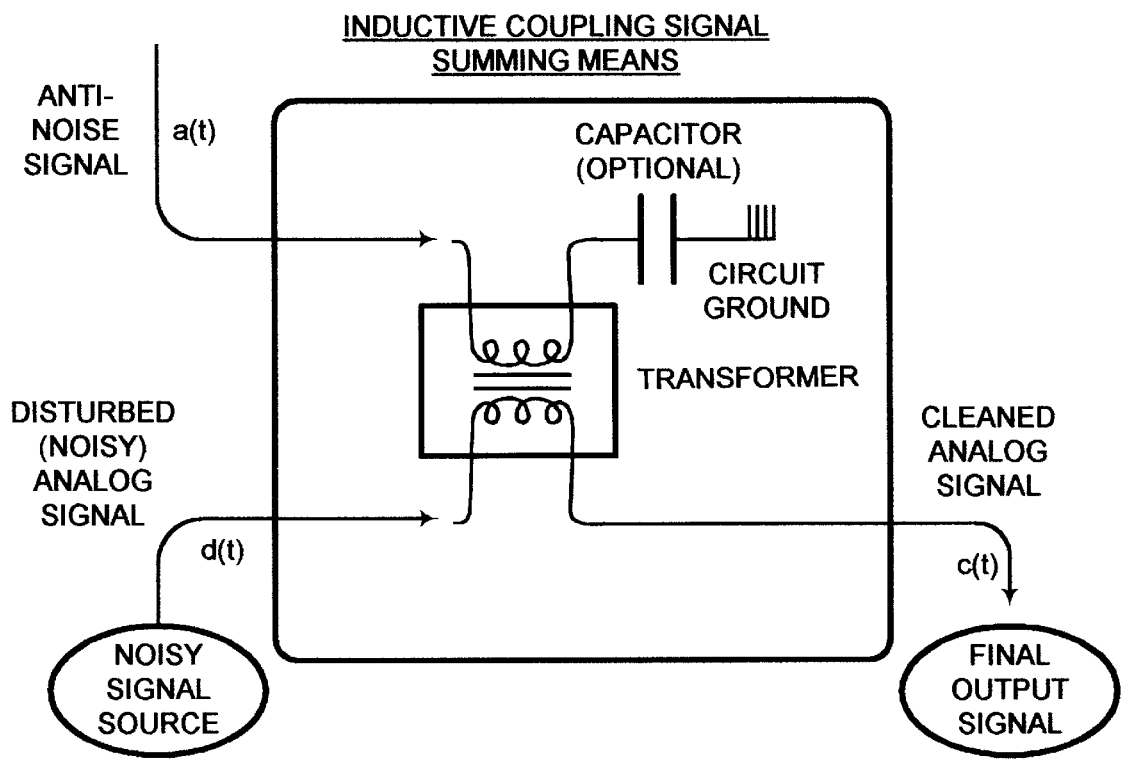
FIG. 13 is a schematic illustration of an analog signal summing device incorporating an inductive coupling for use in practising the invention.

A preferred way to sum an anti-noise signal a(t) with signal d(t) is to inductively couple these signals using a transformer, or an arrangement of wire coils equivalent to a transformer (FIG. 13). A first coil of the transformer connects a(t) to ground, preferably via a capacitor, and a second coil connects the disturbed signal, d(t) to the cleaned signal c(t). It is highly preferable that the device which drives the first coil with the signal a(t) has a low output impedance relative to the impedance of the first coil for frequencies at, and above the frequency of noise generator 20. An operational amplifier fulfills this requirement. This allows the circuit generating a(t) to maintain the voltage applied to the first coil even though the voltage induces current flow through the first coil to ground. The capacitor is used to block any DC component which may be present in a(t). The capacitor should have a capacitance large enough that the filter effect introduced by its presence has a minimal influence on the fundamental and harmonics of a(t).

When using an inductive coupling for summing a(t) and d(t) it is also highly preferable that the instrument receiving the cleaned output signal, c(t), has a high input impedance. This limits the current flow across the second coil to very low levels. Under these conditions the effects caused by impedance and self inductance of the second coil will be minimal. Therefor the second coil will not act as a choke. However, current flow through the first coil driven by a(t) will induce a voltage in the signal present in the second coil connected to d(t). The end result is that the anti-noise signal a(t) is added to d(t).

Using an inductive coupling to sum a(t) and d(t) has the following advantages. First, any DC component in the anti-noise signal a(t) is lost across the inductive coupling. Second, the signal d(t) remains electrically isolated from any clock noise on the grounds of any microprocessor circuit that may be used to implement the invention. Third, an inductive coupling does not introduce any additional active components into the signal path. This avoids the additional broad band noise, DC shifts, and gain errors that can be introduced by active components such as operational amplifiers. Fourth, inductive coupling can be used even if the voltage on d(t) exceeds the power rails of the electronic circuitry. For example, where d(t) is a signal on a telephone line, the large DC bias and power swings which are typically present on telephone lines will pass through the second coil without clipping or distortion whereas the same signal could well be clipped by a summing amplifier. Fifth, the second coil will pass very high frequency signals without the need for specialized amplifier design.

Figure 11:
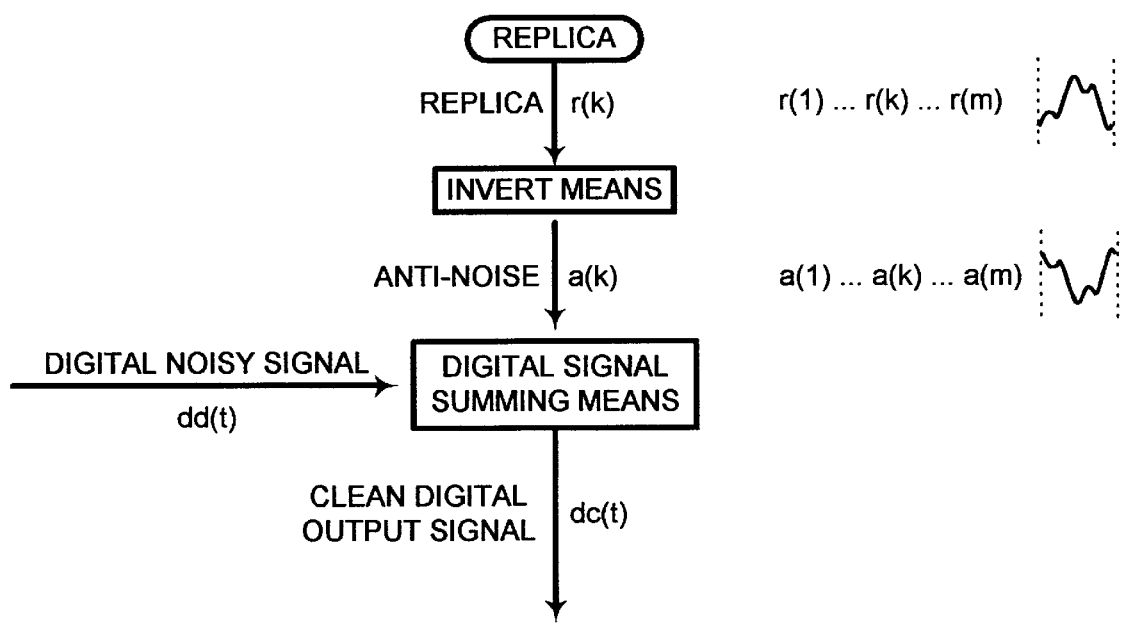
FIG. 11 is a block diagram illustrating the generation of an anti-noise signal in the digital domain.

If d(t) is a digital signal then the addition of an anti-noise signal to the disturbed signal takes place in software or in digital circuitry as shown in FIG. 11. A DAC is not necessary. Instead, the digital anti-noise values, da(t), are passed directly to a digital summing means where they are digitally added to the digital disturbed signal, dd(t).

The feed forward systems for noise cancellation described above suffer from the disadvantage that there is no built in compensation for errors that may arise in the generation of the anti-noise signal a(t). This disadvantage can be overcome by using a feedback noise cancellation system, as described below.

Basic Feed Back Noise Cancellation Method and Apparatus

Figure 15:
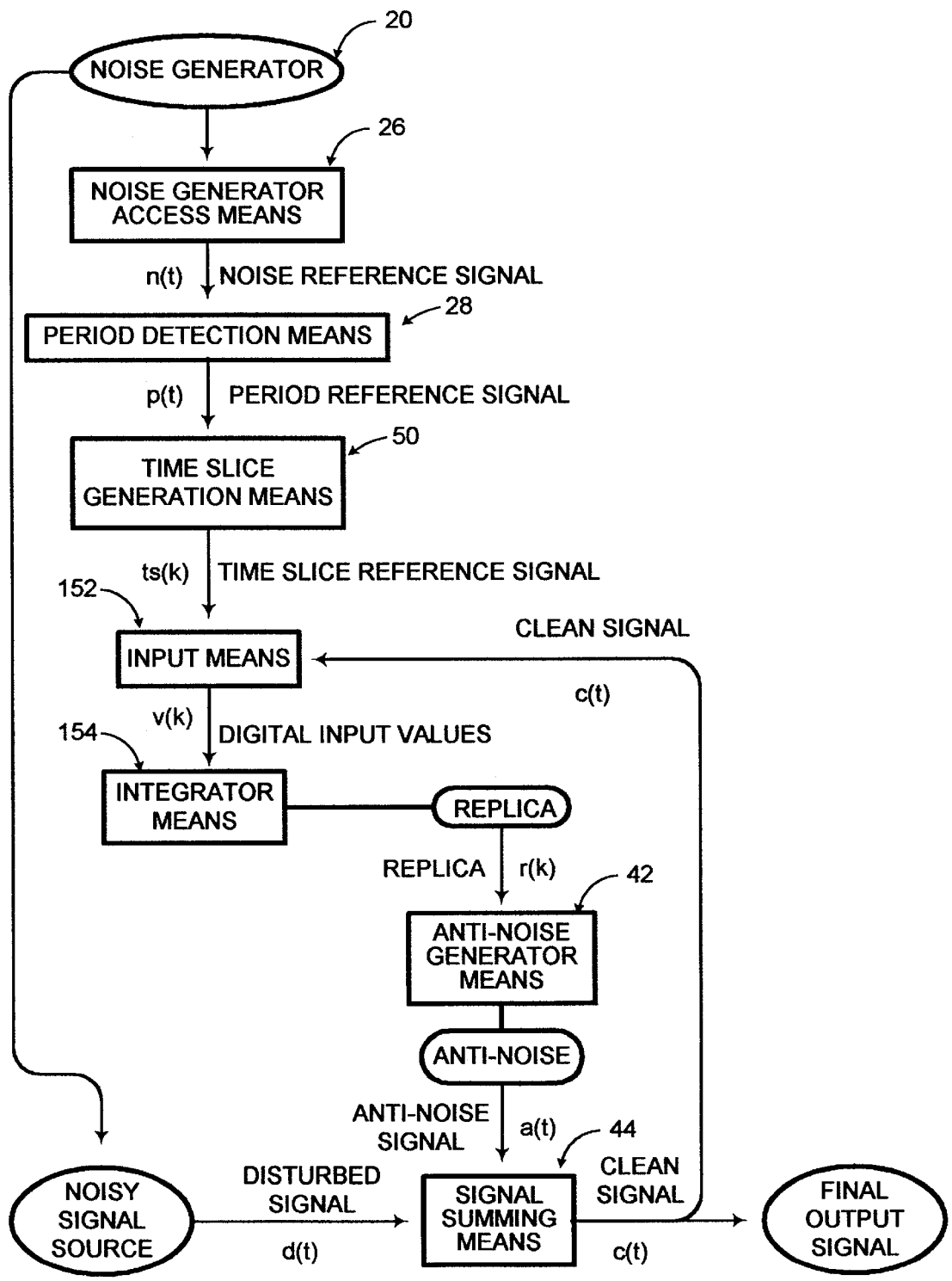
FIG. 15 is a functional flow diagram for a basic feed back type of electrical interference cancellation device according to the invention.

In a feedback embodiment of the invention, as shown in FIG. 15, the cleaned signal, c(t), is passed to the input means 152 (FIG. 15) (i.e. the electrical signal in question is sampled after the addition of an anti-noise electrical signal). The amount of remaining noise in c(t) is used to update the noise replica. In other words, the noise replica is adjusted in such a way as to minimize the noise present on the output, c(t).

Figure 16:
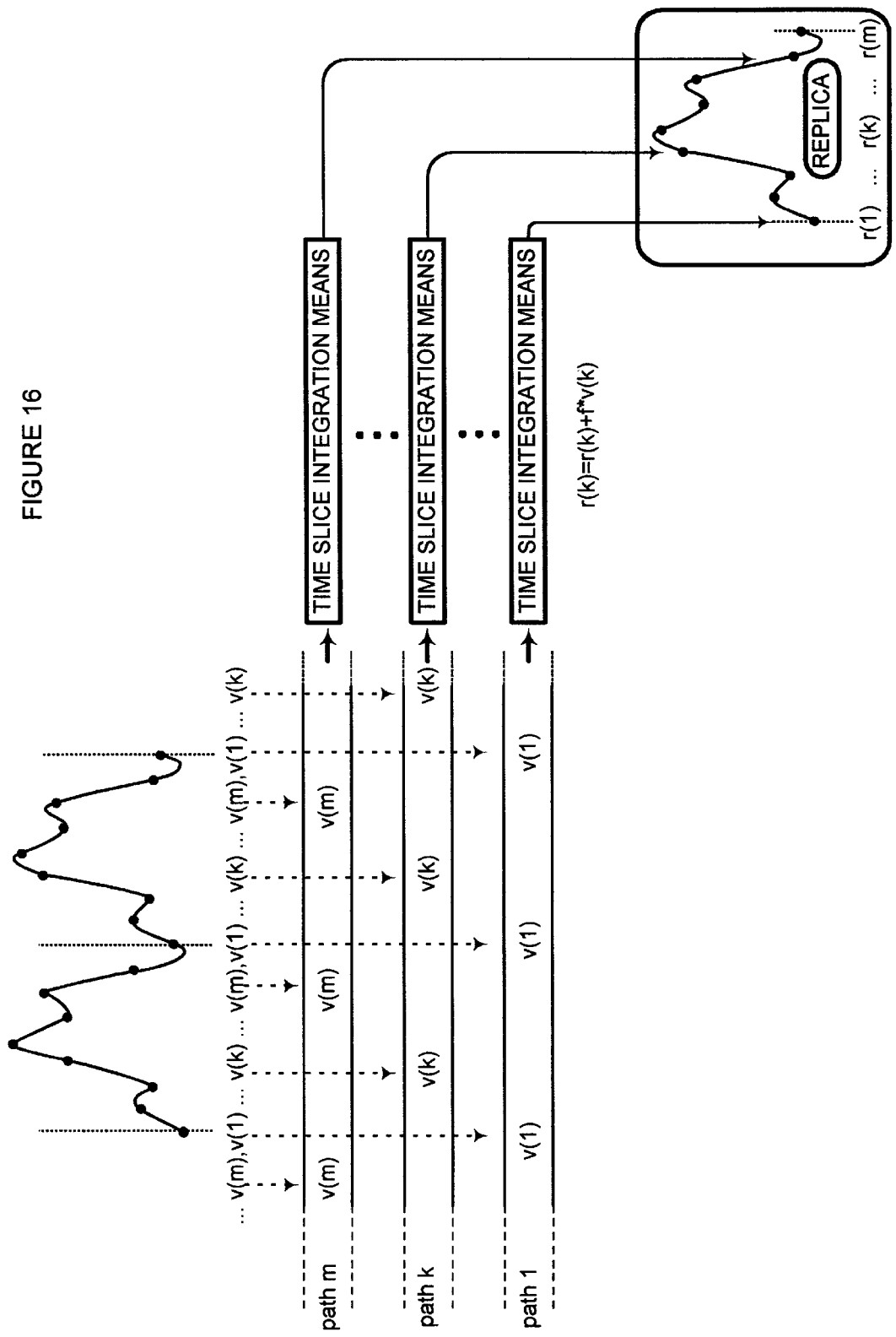
FIG. 16 illustrates the step of time slice integration used in some embodiments of the methods of the invention.

In the embodiment of FIG. 15, a noise replica is generated by a time slice integrator 154. Integrator 154 is similar in operation to the time slice low pass filter (FIG. 9) in that it treats values corresponding to a given time slice as a digitized signal (FIG. 16). Integrator 154 differs from the digital low pass filter described above only in the function used. The function used in integrator 154 generates a new value $r_{new}(k)$ for each point in the noise replica by adding a fraction of each new value v(k) to the corresponding point in the current internal representation of the noise replica, r(k) as shown in FIG. 16.

When all of the points in the noise replica have values of zero (i.e. the noise replica represents a flat line wave form), no cancellation will occur. Therefore, all of the noise e(t) will appear at the output. Under these conditions the values v(k) obtained by the input means will have a constant component associated with the periodic noise on c(t) and a variable component associated with the signal of interest u(t). The constant component will be accumulated in the noise replica, and the shape of the replica will be altered in the correct direction to reduce this noise. Eventually the noise will approach zero as the replica approaches the correct shape. When the noise component in c(t) reaches zero, the new values being processed by the time slice integrator means will no longer have a constant non-zero component and the values in the noise replica will remain stable. In effect, the time slice integrator 154 integrates the error associated with the present noise replica until the error approaches zero. On the other hand, real world signals will have no lasting influence on the shape of the replica since they are associated w it h irregular input values for a given slice.

A major advantage of the feed back method over the feed forward method described above is that the feed back method automatically corrects for any gain or offset errors in the electronic circuitry.

PREFERRED EMBODIMENT OF THE INVENTION

Figure 17:
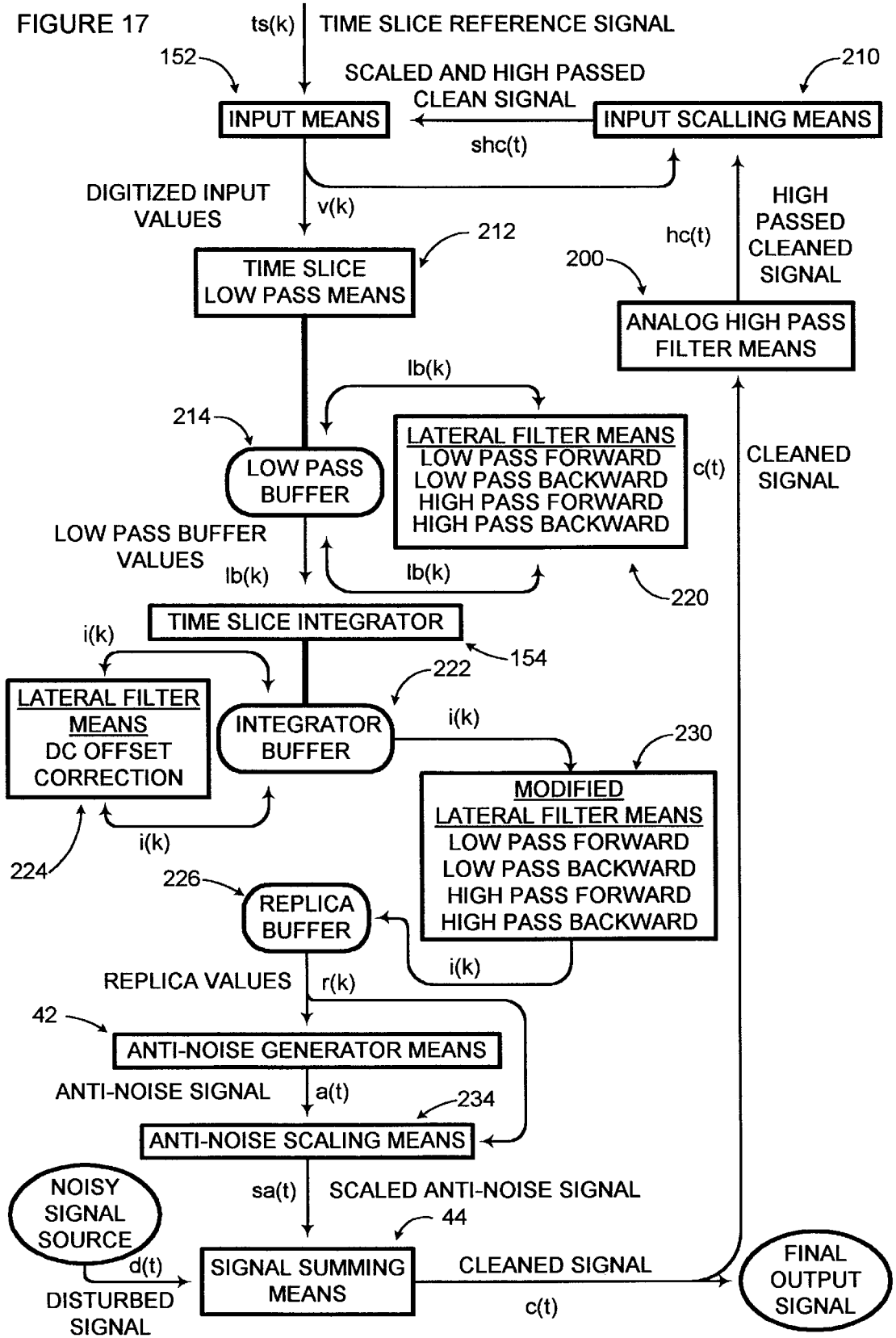
FIG. 17 is a functional flow diagram illustrating the operation of a preferred feed back type electrical interference cancellation device according to the invention.

The preferred embodiment of the invention is illustrated schematically in FIG. 17. Those skilled in the art will realize that many of the features in the preferred embodiment are optional in the sense that a workable noise cancellation device can be made without such optional features. One of the features of this preferred embodiment is the presence of two buffers in addition to the replica buffer. The preferred embodiment also incorporates several lateral filters, an analog high pass filter and input and output scaling means. These additional features remove DC bias and decrease unwanted variability in the noise replica caused by real world signals. The following description follows the flow of signals around the feedback loop starting with c(t).

The cleaned signal c(t) is first passed through an analog high pass filter 200. Filter 200 removes any DC bias from c(t). Filter 200 passes all higher frequency signals (e.g. all signals over 6 Hz). Periodic noise signal e(t) has no DC bias, by definition. Therefor, the DC is removed before it has an opportunity to influence the noise replica. A digital filter could be used instead of analog filter 200. However, a digital filter would have to be implemented after the signal is digitized. An advantage of an analog filter 200 is that it can remove low frequency components before the digitization step. This permits the gain of the signal to be adjusted before the signal is digitized to maximize the resolution of the digitization step.

Figure 20:
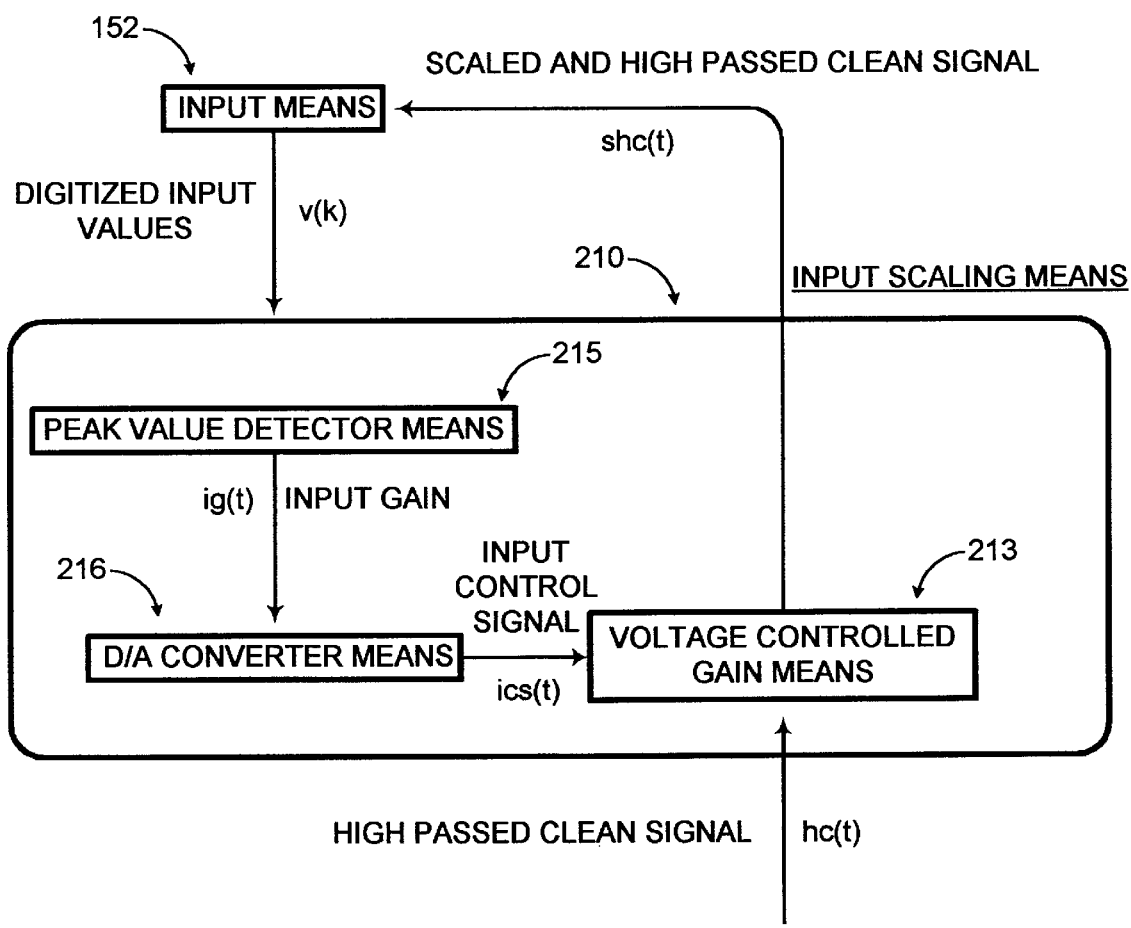
FIG. 20 illustrates an embodiment of an input scaling subsystem which is used in the preferred embodiment of the invention; and, FIG. 21 is a flow diagram illustrating the operation of an anti-noise scaling means for use in practising the invention.

The output of filter 200 is connected to an input scaling means 210. Input scaling means 210 (see also FIG. 20) includes a variable gain device 213 such as a voltage controlled amplifier. The gain of variable gain device 213 is adjusted depending upon the amplitude of signals received by the input means 152 so that the amplitude of signals reaching input means 152 is near the maximum level acceptable to input means 152. This allows the system to track signals with large variations in dynamic range. For example, if input means 152 incorporates an ADC capable of handling inputs in the range of ∓5 volts then the gain of variable gain device 213 could be adjusted so that the peak value of the signal shc(t) reaching input means 152 is about 4.8 volts or so.

Input scaling means 210 preferably includes a peak value detector 215 which receives the digitized values v(k) from input means 152. Peak value detector 215 monitors the absolute values of v(k) and determines the maximum value received during the preceding period. Peak value detector 215 then compares this peak value to an optimal peak value and adjusts the input gain signal, ig(t), in an amount which is proportional to the difference between the optimal and actual value. A DAC 216 receives the new input gain, ig(t), and generates a control voltage ics(t) which controls the gain of variable gain device 213.

The output from input scaling means 210 is delivered to input means 152 which operates as described above to generate a series of sequences of digitized sampled values v(k) under the control of the time slice reference signal ts(k). Each sequence of sampled values represents a digitized segment of the output electrical signal c(t) having a length equal to a period of the interference signal e(t).

The series of sampled values v(k) from input means 152, are then digitally filtered, as described above with reference to FIG. 9. The filtering is done separately for each different value of k (k can have values between 1 and m). The resulting values are stored in a low pass buffer 214.

Figure 18A:
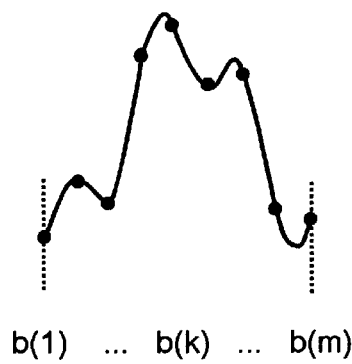
FIGS. 18A, 18B, 18C, 18D and 18E illustrate the step of lateral filtering which is used in the preferred embodiment of the invention.
Figure 18B:
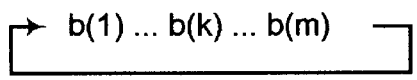
Figure 18C:
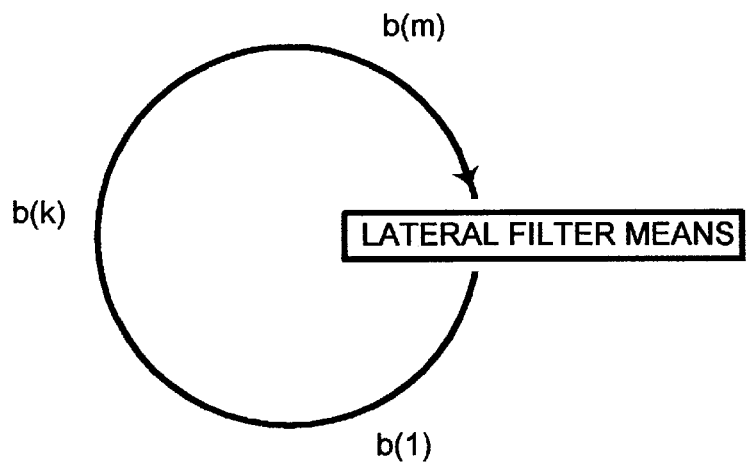
Figure 18D:
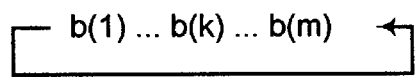
Figure 18E:
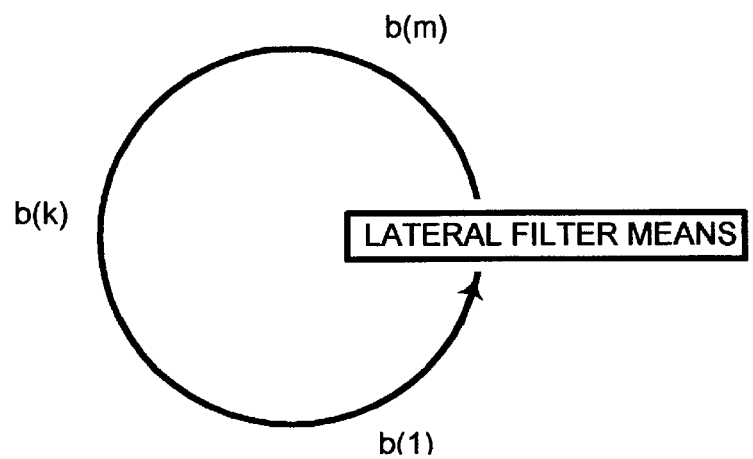

In each period, the values stored in low pass buffer 214 are laterally filtered as indicated by 220. In lateral filtering low pass buffer 214 (FIG. 18A) is treated as a continuous waveform stored in a circular buffer (FIG. 18B). This waveform is digitally high pass filtered and low pass filtered (FIG. 18C). The result is placed back into low pass buffer 214 (FIG. 18D). The high pass filtering removes any DC component. The low pass filtering helps to reduce the impact of real world signals on the noise replica. In effect, low pass lateral filtering sacrifices the adaptation rate to high frequency components in the noise replica in exchange for a reduction in unwanted fluctuations in the noise replica caused by real world signals. These lateral filters are applied in both the forward (FIG. 18C) and the reverse (FIG. 18E) directions to prevent the introduction of any phase errors.

Laterally filtered data from low pass buffer 214 is used as an input to a time slice integrator 154 which operates as shown in FIG. 16 and described above. The output from integrator 154 is placed in an integrator buffer 222. The integration is carried out on a filtered version of the input signal. One advantage of this is that time slice low pass filter 212 removes some of the variability arriving at integrator 154. This decreases the effect of real world signals on the integrated value. A second, more important advantage, is the fact that the low pass buffer provides an opportunity to carry out lateral filtering (FIGS. 18 and 19) as described above.

One problem associated with integration is the possible accumulation of DC offsets. If an offset occurs it cannot be corrected by the feed back loop since high pass filtering at various stages removes DC information. Therefor a further lateral filter, indicated by 224, is periodically applied to the contents of integrator buffer 222 to remove any accumulated DC bias error by forcing the average of the values in integrator buffer 222 to zero.

Figure 19A:
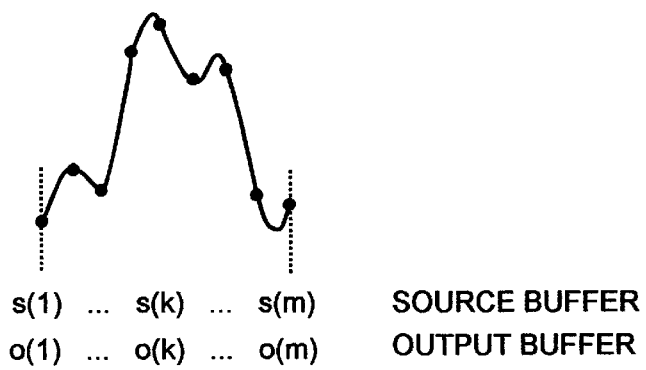
FIGS. 19A, 19B and 19C illustrate the step of modified lateral filtering which is used in the preferred embodiment of the invention.
Figure 19B:
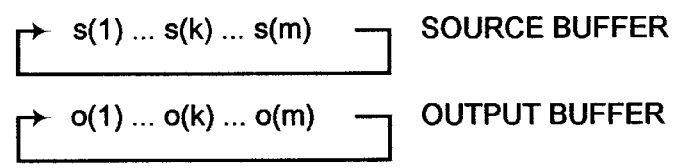
Figure 19C:
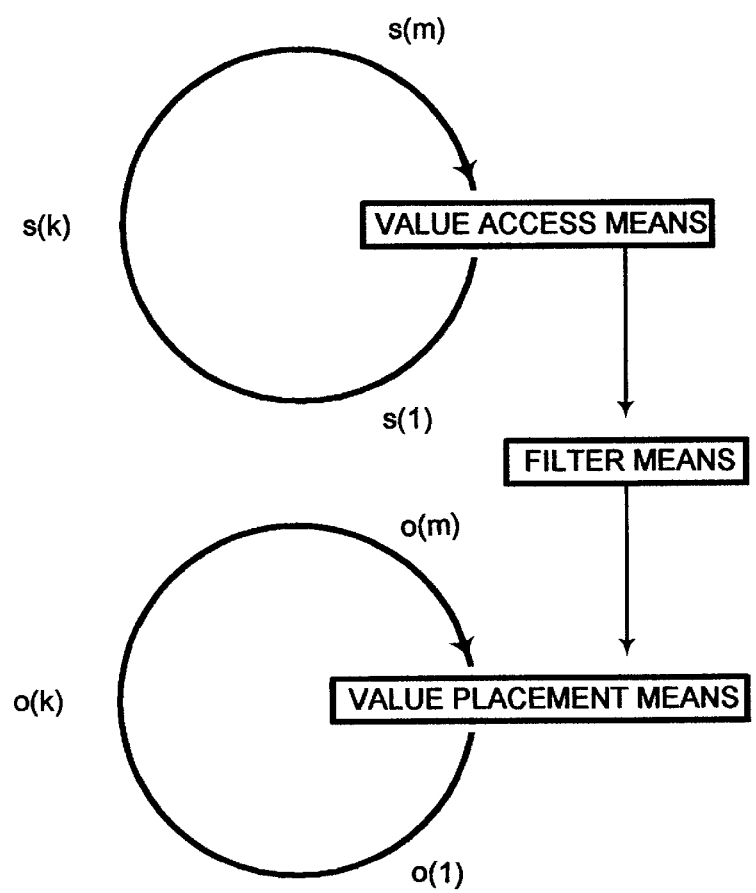

The replica stored in replica buffer 226 is derived from the values stored in integrator buffer 222 by a modified lateral filtering step indicated by 230 and illustrated schematically in FIG. 19. In modified lateral filtering, the contents of a buffer (FIG. 19A) are treated as a continuous waveform stored in a circular buffer (FIG. 19B). However, the filtered values are not returned to the same buffer. Instead, the filtered values are moved to an output buffer (FIG. 19C). In this case, the output buffer is replica buffer 226 which holds the replica, r(k). The modified lateral filtering step further reduces any variability in the replica r(k) caused by real world signals and reduces any remaining DC offset.

The replica r(k) is used to generate an anti noise signal a(t) as described above and illustrated in FIGS. 10 and 11. Preferably anti-noise signal a(t) is scaled by an anti-noise scaling means 234 before it is added to the disturbed signal d(t).

Figure 21:
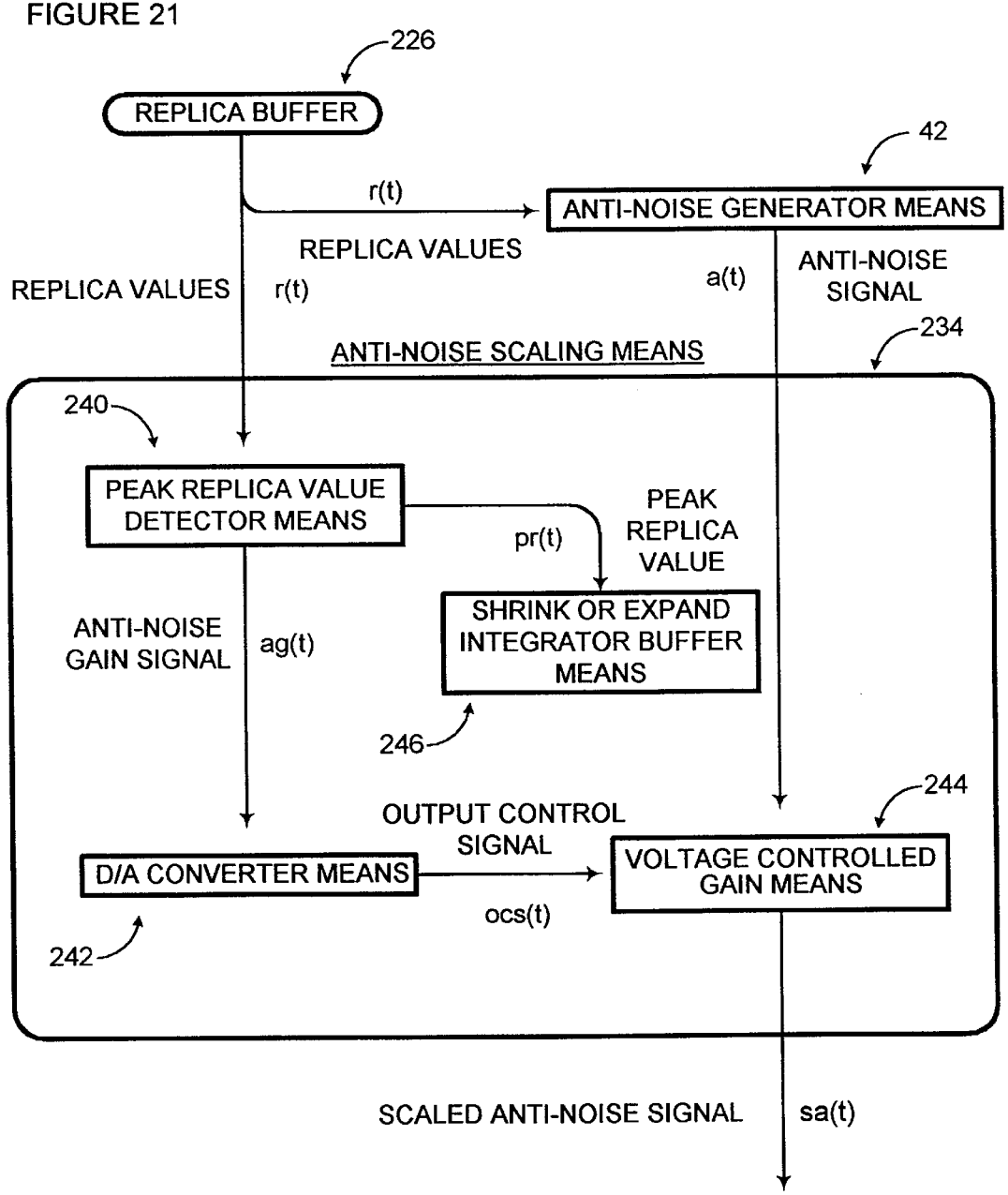

A preferred anti-noise scaling means 234, illustrated in FIG. 21, monitors the maximum magnitude of the values stored in noise replica buffer 226. The absolute peak value within buffer 226 is used to adjust both the gain applied to the anti-noise signal, a(t), and the amplitudes of values in the integrator buffer. This allows the use of the full resolution of the DA converter in anti-noise generator 42 even when noise levels are very low.

As shown in FIG. 21, peak replica value detector 240 accesses the values stored in replica buffer 226 and determines the absolute peak value during a given period of operation. If the peak value is within a predetermined window, then the gain is left unchanged. If the peak value is greater than the maximum of the window, the anti-noise gain, ag(t), is multiplied by a predetermined value to decrease the gain. If the peak is less than the minimum of the window, then the anti-noise gain is divided by the same factor. The value of the ag(t) is passed to a DAC 242 which generates an analog control signal ocs(t). The gain of a variable gain device 244 is controlled by the magnitude of ocs(t).

When the gain of device 244 is changed then the values stored in integrator buffer 226 are scaled inversely. Integrator buffer adjustment means 246 receives the peak replica value, pr(t), from peak replica value detector 240. Integrator buffer adjustment means 246 uses the same window and adjustment factor as peak replica value detector means 240 uses to adjust the anti-noise gain. If the peak value is within the window the integrator buffer is left unchanged. If the peak replica value is greater than the maximum level, then integrator buffer adjustment means 246 divides all of the values within the integrator buffer by the adjustment factor. If the peak of the replica in buffer 226 is less than the minimum value, then it multiplies all of the values in integrator buffer 222 by the adjustment factor.

The result of the combined action of changing the gain of variable gain device 244 and adjusting the values in integrator buffer 222 is that the amplitude of the scaled anti-noise signal, sa(t), remains constant and the peak value in replica buffer 226 re-enters the acceptable window. Note that replica buffer adjustment is not direct. Instead, it adjusts as a consequence of adjusting the integrator buffer.

The input and anti-noise scaling means described above have an important influence on the gain within the negative feed back loop of the described system. Loop gain is proportional to the product of the gains provided by the input and anti-noise scaling means. When loop gain is relatively high the noise replica will approach the shape of noise on d(t) more quickly whereas real world signals will cause relatively more unwanted variability. On the other hand, low loop gains are associated with slow adaptation of the replica but good immunity to real world signals. The scaling means automatically force the loop gain to high level when d(t) is dominated by noise and low levels when d(t) is dominated by a real world signal. This allows the embodiment to rapidly respond to very noisy signals yet minimize unwanted variability caused by real world signals with small amounts of imbedded noise.

Figure 14:
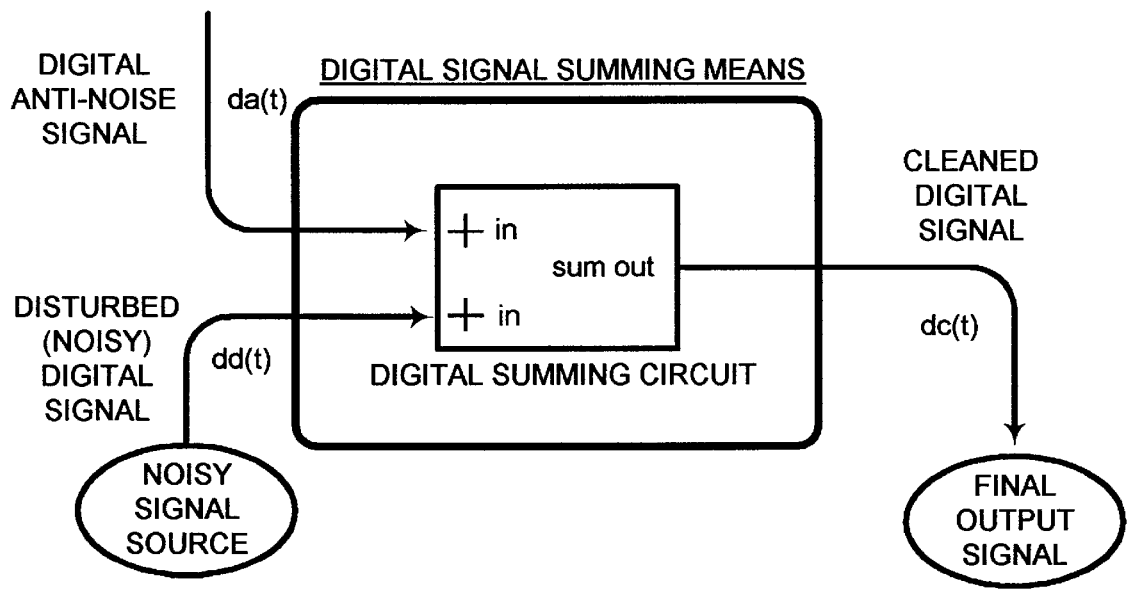
FIG. 14 is a schematic illustration of a digital summing step for use in practising the invention.

Finally, the scaled anti-noise signal is added to d(t) to produce cleaned signal c(t) by signal summing means 44. Signal summing means 44 is described above with reference to FIGS. 12, 13 and 14. The preferred embodiment uses inductive coupling to add sa(t) to d(t) since it eliminates any remaining DC bias and isolates the signal path involving d(t) and c(t) from clock noise generated by the microprocessor which is preferably used to implement the invention. Use of the inductive coupling also avoids the introduction of operational amplifiers, or other active devices, into the signal path.

Those skilled in the art will realize that the methods described above can readily be implemented in a programmed computer equipped with suitable interfaces to input the electrical signal d(t) or c(t) and to output anti noise signal a(t) (or sa(t)). The following pseudo code illustrates a computer implementation of the embodiment of the invention. Comments are prefaced by "/*/"

Parameter definitions: The following list identifies the buffers, constants and variables used in the pseudo code. Initialization of the parameters is also indicated.

Buffers: Each of these buffers has a total of m locations indexed from k=1 to k=m. All values are cleared to zero during initialization.

1b(k)—low pass buffer 214; i(k)—integrator buffer 222; r(k)—replica buffer 226;

Constants: These constants are set during initialization and not changed as the pseudo code runs.

m—Total number of time slices per period of the noise generator. The preferred value is 512 slices per period. The highest frequency, and therefor the highest harmonic, represented in the anti-noise depends on m. When m is 512 the anti-noise is generated at a rate of 512 points per period of the noise generator. If the noise source is 60 Hz power in the mains then the anti-noise data rate is 512*60=30,720 values per second. This data rate can reproduce anti-noise with harmonic components as high as 15, 360 Hz (data rate/2). However, the shape of this highest harmonic will be poorly represented. In practical terms, it actually takes several data points to represent the basic shape of a waveform. In the preferred embodiment, the corners of the lateral filters are preferably set to limit the actual frequency content of the anti-noise to below 3,000 Hz for most power line hum cancelling applications.

B—Filter factor for time slice low pass means. This factor sets the time constant of the time slice low pass filter implemented in the pseudo code. The value must be less than 1 and practical values are generally less than 0.1. Values between 0.01 and 0.001 have been successfully used in the preferred embodiment. The value 0.01 corresponds to a time constant of 1.7 seconds and the value 0.001 corresponds to a time constant of 17 seconds. This time constant is important in determining the overall time constant for adaptation to a new noise waveform.

A—Integration factor for time slice integrator. This factor sets the time constant for the integration function in the pseudo code. As for B, the value must be less than 1 and practical values are generally less than 0.1. Values between 0.01 and 0.001 have been successfully used in the preferred embodiment. The value 0.01 corresponds to a time constant of 1.7 seconds and the value 0.001 corresponds to a time constant of 17 seconds. This time constant is also important in determining the overall time constant for adaptation to a new noise waveform.

LLFact—Filter factor for lateral low pass means. This factor sets the time constant for both the forward and reverse lateral low pass filter applied to the low pass buffer. Values in the range of 0.1 to 0.5 have been used successfully in the preferred embodiment. A value of 0.1 corresponds to corner frequency of approximately 500 Hz and 0.5 corresponds to approximately 2,500 Hz.

LHFact—Filter factor for lateral high pass means. This factor sets the time constant for both the forward and reverse lateral high pass filter applied to the low pass buffer. Values in the range of 0.001 to 0.01 have been used successfully in the preferred embodiment. A value of 0.001 corresponds to corner frequency of approximately 5 Hz and 0.01 corresponds to approximately 50 Hz.

MLLFact—Filter factor for modified lateral low pass means. This factor is usually in the same range as LLFact.

MLHFact—Filter factor for modified lateral high pass means. This factor is usually in the same range as LHFact.

GNC—Integration factor for input gain scaling means. This factor sets the time constant for increasing or decreasing the input gain when the input signal changes amplitude. The value must be less than one. Values of 0.1 and less have been used successfully in the preferred embodiment.

OPPK—Optimal peak value received by the input means. This value is usually 80% of the maximum value returned by the AD converter. For example, if a bipolar 12 bit converter is used, then OPPK would be 0.8*2048=1638. An input signal at this optimal level will use most of the dynamic range of the AD converter but will leave 20% headroom so that slightly larger values are not clipped.

MaxLoopGain—Maximum net gain generated by the input scaling and anti-noise scaling means. The product of the input and output gain is kept below this maximum in order to maintain stability in the feed back loop. This constant is normally set to a value between 1 and 3.

WH—High window. This constant sets the maximum level within the replica before output gain is increased and the integrator buffer is re-scaled to smaller values. This value is usually 80% of the maximum value accepted by the DA converter. For example, if a bipolar 12 bit converter is used, then WH would be 0.8*2048=1638.

WL—Low window. This constant sets the minimum level within the replica before output gain is decreased and the integrator buffer is re-scaled to larger values. This value is usually 50% of the maximum value accepted by the DA converter. For example, if a bipolar 12 bit converter is used, then WH would be 0.5 *2048=1024.

RSF—Adjustment factor for anti-noise scaling means. This factor sets the increment used to adjust the gain when the replica falls outside of the window defined by WL and WH. Values should be less than 0.1 (0.6 second time constant) and are usually in the order of 0.01 (6 second time constant).

MinOutGain—Minimum gain value for anti-noise gain means. This gain will be the lowest gain that the voltage controlled gain stage is capable of generating in a reliable manner. In the preferred embodiment, this value is usually 0.001.

Variables: These variables change value during the pseudo code. They are all initiated to zero on initialization of the pseudo code with the exception that the time slice index, k, is initiated to 1.

LL—filtered value for lateral low pass means
LH—filtered value for lateral high pass means
RLL—filtered value for reverse lateral low pass means
RLH—filtered value for reverse lateral high pass means
MLL—filtered value for modified lateral low pass means
MLH—filtered value for modified lateral high pass means
MRLL—filtered value for modified reverse lateral low pass means
MRLH—filtered value for modified reverse lateral high pass means
PKC—peak value of input values during last period of operation
InGain—gain used for input scaling
C—the most recent value received by the input means
PREVlb—the low pass buffer value processed by the high pass forward lateral filter means during the previous time slice.
PREVRlb—the low pass buffer value processed by the high pass reverse lateral filter means during the previous time slice.
PREVi—the integrator buffer value processed by the modified high pass forward lateral filter means during the previous time slice.
PREVRr—the replica buffer value processed by the modified high pass reverse lateral filter means during the previous time slice.
temp—temporary value
RunSum—running sum of all values in the integrator buffer, i.
PKREP—peak value in the replica buffer
OutGain—gain used for anti-noise scaling
index—index used in for loop to access sequentially access the integrator buffer during anti-noise re-scaling.
This code is run for each pulse ( or edge) on the time slice reference signal.
START
Input means gets next input value
1 C=AD converted value from shc(t)
   /*/ The signal shc(t) is connected to the analog side of an analog to digital converter. Initiate conversion to access the present value and store it in the variable C.
Time slice lov pass means
2 lb(k)=lb(k)+B(C-lb(k))
   /*/ Update the location in the low pass buffer corresponding to the present time slice, k. This function simulates a simple RC low pass filter.
Input scaling means (every time slice component)
3 ABS=absolute_value(C)
   /*/ Get the absolute value of C, the value acquired in the previous step.
4 is ABS-PKC>0?
IF yes then PKC=ABS, continue
   /*/ Keep track of the input value with the greatest amplitude processed during a given period (k=1 to m). This peak value, PKC, is cleared once per m time slices in the section of code run once per period.
forward lateral low pass and high pass means
5 LH=LH+(lb(k)-PREVlb)
   /*/ Update the lateral high pass value, LH, using a function which simulates the first phase a simple low pass RC filter. The second phase is carried out a later step. PREVlb is the value of the low pass buffer processed in the preceding time slice.
6 PREVlb=lb(k)
   /*/ Save the value of this time slice for processing during the next time slice.

7 LL=LL+LLFact(LH-LL)
   /*/ Update the lateral low pass value, LL, using a function which simulates a simple RC filter. The filter is applied with respect to the lateral high pass value, LH. As a result, the value lb(k) is passed in series through a high pass and then a low pass function.
8 lb(k)=LL
   /*/ The result of the combined high and low pass lateral filtering is returned to the low pass buffer location corresponding to the present time slice, k.
9 LH=LH-LHFact*LH
   /*/ The final phase of the lateral high pass function is now performed in preparation for the next time slice.
reverse lateral low pass and high pass means
10 RLH=RLH+(lb( (m+1)-k)-PREVRlb)
   /*/ The first step of the lateral high pass function is applied to the low pass buffer in the reverse direction. PREVRlb is the value of low pass buffer processed in the proceeding time slice. The index of the buffer processed in the function is m+1-k, not k as in the forward direction of lateral filtering. This calculation generates a k value which circulates through the low pass buffer from high to low index values.
11 PREVRlb=lb((m+1)-k)
   /*/ The value of the low pass buffer processed during this time slice is saved for use during the next time slice.
12 RLL=RLL+LLFact(RLH-RLL)
   /*/ Update the reverse lateral low pass value, RLL, using a function which simulates a simple RC filter. The filter is applied with respect to the lateral high pass value, RLH. As a result, the high pass and low pass functions are applied in series to the value taken from the low pass buffer, lb((m+1)-k).
13 lb((m+1)-k)=RLL
   /*/ The result of the combined high and low pass filtering is returned to the low pass buffer location corresponding to the time slice which is being processed in the reverse direction.
14 RLH=RLH—LHFFact*RLH
   /*/ The final phase of the reverse lateral high pass function is now performed in preparation for the next time slice
Integrator means
15 temp=i(k)
   /*/ Keep the value in the integrator buffer, I, corresponding to the present time slice, k, for use in updating the running sum (RunSum) of values in the buffer.
16 i(k)=i(k)+(A*lb(k))-(RunSum/m)
   /*/ Update the integrator buffer location corresponding to the present time slice. This is done by taking a fraction of the low pass buffer location for the same time slice and adding this fraction to the value already in i(k). Any DC bias which might have crept into the integrator buffer is removed at the same time by subtracting the average of all the values in the buffer.
17 RunSum=RunSum-temp+i(k)
   /*/ Update the running sum of all values in the integrator buffer by subtracting the old value of i(k) (saved in temp before updating i(k)) and adding the new value of i(k).
modified forward lateral low pass and high pass means
18 MLH=MLH+(i(k)-PREVi)
   /*/ Update the modified lateral high pass value, MLH, using a function which simulates the first phase a simple high pass RC filter. The second phase is carried out in a later step. PREVi is the value of the integrator buffer processed in the preceding time slice 19 PREVi=i(k)
   /*/ Save this value for the next time slice.
20 MLL=MLL+MLLFact(MLH-MLL)
   /*/ Update the modified lateral low pass value, MLL, using a function which simulates a simple RC filter.
   The filter is applied with respect to the lateral high pass value, MLH. As a result, the value i(k) is passed in series through a high pass and then a low pass function.
21 r(k)=MLL
   /*/ The result of the combined high and low pass filtering is used to replace the present value in the replica buffer in the location corresponding to the present time slice, k. Thus the input values are obtained from the integrator buffer and the filtered results are put into the replica buffer.
22 MLH=MLH-MLHFact*MLH
   /*/ The final phase of the modified lateral high pass function is now performed in preparation for the next time slice.
modified reverse lateral low pass and high pass means
23 MRLH=MRLH+(r((m+1)-k)-PREVRr)
   /*/ The first step of the modified lateral high pass function is applied to the replica buffer in the reverse direction. PREVRr is the value of the replica buffer processed in the preceding time slice. The index of the buffer processed in the function is m+1-k, not k as in the forward direction of lateral filtering.
   This calculation generates a k value which circulates through the replica buffer from high to low index values.
24 PREVRr=r((m+1)-k)
   /*/ The value of the replica buffer processed during this time slice is saved for use during the next time slice.
25 MRLL=MRLL+MLLFact(MRLH-MRLL)
   /*/ Update the modified reverse lateral low pass value, MRLL, using a function which simulates a simple RC filter. The filter is applied with respect to the modified lateral high pass value, MRLH. As a result, the high pass and low pass functions are applied in series to the value taken from the replica buffer.
26 r((m+1)-k)=MRLL
   /*/ The result of the combined high and low pass filtering is returned to the replica buffer location corresponding to the time slice which is being processed in the reverse direction.
27 MRLH=MRLH-MLHFact*MRLH
   /*/ The final phase of the modified lateral high pass function is now performed in preparation for the next time slice
Anti-noise generator means puts out analog value
28 temp=-r(k)
   /*/ Invert the replica value for this slice to get the corresponding anti-noise value.
29 pass temp to DA converter
30 DA convert to generate a(t)
   /*/ Convert the anti-noise value into an analog signal.
Anti-noise scaling means (every time slice component)
31 ABS=absolute_value(r(k))
   /*/ Get the absolute value of the replica buffer corresponding to the present time slice.
32 is ABS-PKREP >0?
   IF yes then PKREP=ABS
   /*/ Keep track of the peak value within the buffer.
time slice counter means
33 k=k+1
   /*/ Increment the time slice counter, k, in preparation for the next time slice 34 is k <=m?
   IF yes then jump to DONE
   /*/ k is not beyond the end of the buffer.
35 k=1
   /*/ If k is greater than m, then the index, k, should wrap around to the first time slice (k=1) in the buffer.
Anti-noise scaling means (once per period component)
36 is PKREP <=WH?
   IF yes then jump to CHECK LOWER WINDOW
   /*/ Check to see if the peak replica value is less than or equal to the upper level of the predefined window.
37 OutGain=OutGain*RSF
   /*/ OutGain must be too low so increase it by the factor RSF.
38 is OutGain >1?
   IF yes then OutGain=1
   /*/ The output gain is not allowed to be greater than 1.
39 FOR index=1 TO m, i(index)=i(index)/RSF
   /*/ Shrink the entire integrator buffer by dividing each value by the factor, RSF. This will indirectly cause the values in the replica buffer to fall within the window.
CHECK LOWER WINDOW
40 is PKREP >=WL?
   IF yes jump to CONTINUE
   /*/ Check to see if the peak replica value is greater than or equal to the lower level of the predefined window.
41 OutGain=OutGain/RSF
   /*/ OutGain must be too high so decrease it by dividing it by the scaling factor, RSF.
42 is OutGain <MinOutGain?
IF yes then OutGain=MinOutGain
   /*/ The OutGain is not allowed to be less than a predetermined minimum level.
43 FOR index=1 TO m, i(index)=i(index)*RSF
   /*/ Expand the entire integrator buffer by multiplying each value by the factor, RSF. This will indirectly cause the values in the replica buffer to fall within the window.
CONTINUE
44 PKREP=0
   /*/ Reset the peak replica value, PKREP in preparation for the next complete period of operation.
45 send OutGain to the output gain control voltage DA converter and convert
   /*/ The value of OutGain is used to control the gain in an analog voltage controlled gain stage. Input scaling means (once per period component)
46 InGain=InGain+GNC(OPPK-PKC)
   /*/ The input gain, InGain, is adjusted by an amount proportional to the difference between the predetermined optimal peak value, OPPK, and the actual peak input value received during the last complete period of operation (k=1 to m). The proportionality factor, GNC, is a predetermined constant.
47 PKC=0
   /*/ The peak value of C is cleared in preparation for the next period of operation (k=1 to m).
48 is (InGain*OutGain)-MaxLoopGain >0?
   IF yes then InGain=MaxLoopGain/OutGain
   /*/ The loop gain contributed by the combination of InGain and OutGain is checked against the predetermined constant, MaxLoopGain. If the loop gain is greater than MaxLoopGain, then the input gain is corrected to bring the loop gain back within the acceptable limit.

49 send InGain to the input gain control voltage DA converter and convert

/*/ The value of InGain is used to control the gain in an analog voltage controlled gain stage. DONE—wait for next pulse (edge) on the time slice reference signal.

Those persons skilled in the art will realize from the foregoing disclosure that the methods of eliminating periodic noise from real world signals according to this invention have a significant advantage over previous approaches. The methods of the invention do not alter the original signal of interest. Only signals precisely synchronized to the period of the noise generator are recognized as noise and only if these signals remain precisely locked for long enough for the learning means to respond to their presence. In practical terms, the frequency component of a real world signal would have to remain locked for several hundred periods of the noise generator in order for the learning means to fully respond to its presence.

These requirements are seldom met by frequency components in real world signals. Components in these signals are normally vary with respect to their precise frequency, amplitude, and relative phase to other components. A given frequency component may become precisely synchronized to the noise generator for a few cycles but these episodes are transient. If the learning means requires many periods to learn about the contribution of a new frequency component, these transient overlaps will not create a significant perturbation of the noise replica.

On rare occasions a real world signal may have a component which is both periodic and precisely synchronized to the noise source. Under these conditions, the learning means will respond and the component will be cancelled along with the noise. Fortunately these situations are easily recognized.

Under ideal conditions the noise replica will be accurate and the cleaned signal will be completely free of periodic noise. However, the noise replica may not be perfect under the following conditions. The shape of the noise may suddenly change. Immediately after the change, the noise replica will still represent the noise as it appeared before the change. This occurs since the learning method requires time to learn the shape of the new noise. If the noise remains stable after the change, the learning method will eventually learn the new shape. During this phase some periodic noise will appear on the cleaned signal. The shape of the noise may gradually change over many periods of the noise source. If the rate of change is too fast, then the learning method may lag behind and some periodic noise will appear on the cleaned signal. The signal of interest may contain components which are very near the periodic frequency of the noise. If these components remain synchronized to the noise generator for substantial lengths of time the learning method will mistake them for noise. As a result, the noise replica will not be perfect and some periodic noise will appear on cleaned signal. These situations point out the fact that the learning means can fail to learn the exact shape of the noise waveform. Under these conditions, some periodic noise will remain in the cleaned signal. However, the magnitude of the noise is reduced in most cases. The only time that the noise on the cleaned signal is likely to be greater than on the noisy signal is immediately following a complete inversion of the noise waveform.

It is important to point out that the original signal of interest is never altered even if some noise remains unconcealed in the cleaned signal. Any imperfections of the noise replica will always appear as periodic noise even if the imperfections were the result of overlapping frequencies between the signal of interest and the periodic noise. Instead of distorting the signal of interest, overlapping frequencies influence the shape of any remaining periodic noise on the cleaned signal.

The ability of this invention to totally or partially eliminate periodic noise without altering the signal of interest imbedded in a noisy signal makes it practical to use in situations were the characteristics of the signal are critically important and frequency components in the signal and noise overlap.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method for cancelling electrical interference from an electrical signal, said method comprising the steps of:
   a) providing an electrical signal comprising a signal of interest and a periodic interference signal having a period, said interference signal and said signal of interest both having components at one or more common frequencies;
   b) cancelling said electrical interference signal from said electrical signal, without affecting said signal of interest at said common frequencies, by the steps of:
      i) providing a timing signal having a period equal to said period of said interference signal;
      ii) generating a sequence of digitized segments of said electrical signal by sampling and digitizing said electrical signal at times controlled by said timing signal, each digitized segment comprising a sequence of sampled values representing a segment of said electrical signal having a period equal to said period of said interference signal;
      iii) generating an estimate of said interference signal from said digitized segments by extracting a stationery component from said digitized segments and periodically updating said estimate;
      iv) generating a continuous, periodic anti-interference signal from said estimate; and,
      v) adding said anti-interference signal to said electrical signal to substantially cancel said electrical interference signal from said electrical signal.

2. The method of claim 1 wherein said step of generating an estimate of said interference signal includes the step of applying a series of corresponding sampled values from subsequent digitized segments as an input to a digital low pass filter.

3. The method of claim 2 wherein said digital filter operates according to the function:

$$r_{new}(k) = r_{current}(k) + f \times (v(k) - r_{current}(k))$$

where $r_{new}(k)$ is the output from said digital filter, $r_{current}(k)$ is the current value for a kth point in said estimate, f is a fraction, and v(k) is said sampled value.

4. The method of claim 1 wherein said step of adding said anti-interference signal to said electrical signal to substantially cancel said electrical interference signal from said electrical signal comprises passing said anti-interference signal through a first winding of a transformer and passing said electrical signal through a second winding of said transformer.

5. The method of claim 1 wherein said step of providing said timing signal includes the steps of using an antenna to receive an electromagnetic signal, and amplifying and low-pass filtering said received signal.

6. The method of claim 1 wherein said step of providing said timing signal includes the step of making a direct electrical connection to a noise generator which causes said electrical interference signal.

7. The method of claim 6 wherein said noise generator is an alternating current power main.

8. The method of claim 7 wherein said electrical connection to said noise generator includes a transformer.

9. The method of claim 1 wherein said signal of interest is an audio signal.

10. The method of claim 1 wherein said signal of interest is a bio-electric signal.

11. A method for cancelling interference from a signal, said signal comprising a signal of interest mixed with a periodic interference signal having a period, said method comprising the step of adding an anti-interference signal to said signal to cancel said periodic interference signal from said signal, wherein said anti-interference signal is derived by the steps of:

a) in each of several sequential periods of said periodic interference signal, taking a plurality of m samples v(k), of said signal after said addition of said anti-noise signal, said samples taken at spaced apart phases of said interference signal, where k is an index representing said spaced apart phases with $1 \leq k \leq m$;

b) for each value of k, digitally integrating said sampled values v(k) and storing results of said integration in an integrator buffer;

c) performing a modified lateral filtering operation on said results in said integrator buffer and storing results of said modified lateral filtering operation as values in a replica buffer;

d) creating a continuous anti-interference signal having a waveform defined by said values in said replica buffer.

12. The method of claim 11 comprising the step of, for each value of k, digitally low pass filtering said sampled values v(k) and placing said digitally low pass filtered values v(k) in a buffer before said step of digitally integrating said sampled values v(k).

13. The method of claim 12 comprising the step of laterally filtering said digitally low pass filtered values v(k) in said buffer before said step of digitally integrating said sampled values v(k).

14. The method of claim 11 wherein said step of adding said anti-interference signal to said signal to substantially cancel said interference signal from said signal comprises the steps of generating an analog anti-interference signal by making a digital to analog conversion of said values in said replica buffer, and passing said analog anti-interference signal through a first winding of a transformer and passing said electrical signal through a second winding of said transformer.

15. The method of claim 11 comprising the step of laterally high pass filtering said values in said integrator buffer before said step of performing a modified lateral filtering operation on said results in said integrator buffer.

16. The method of claim 11 comprising the step of high pass filtering said signal before said step of sampling said signal.

17. The method of claim 11 comprising the step of scaling said signal by passing said signal through a variable gain amplifier before said step of sampling said signal.

18. The method of of claim 17 wherein said step of scaling said signal includes reducing a gain of said variable gain amplifier if any of said sampled values v(k) exceeds a threshold value.

19. The method of claim 11 comprising the step of scaling said anti-interference signal before adding said anti-interference signal to said signal, said step of scaling said anti-interference signal including multiplying all of said values in said integrator buffer by a factor and changing a variable gain affecting said anti-interference signal when aniaximum one of said values in said replica buffer exceeds a first threshold value or falls below a second threshold value.

20. The method of claim 13 comprising the step of laterally high pass filtering said values in said integrator buffer before said step of performing a modified lateral filtering operation on said results in said integrator buffer.

* * * * *